United States Patent
Aoki

(10) Patent No.: US 9,891,043 B2
(45) Date of Patent: Feb. 13, 2018

(54) PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

(71) Applicant: NIKON CORPORATION, Chiyoda-ku, Tokyo (JP)

(72) Inventor: Hiroshi Aoki, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/648,674

(22) Filed: Oct. 10, 2012

(65) Prior Publication Data
US 2013/0141734 A1 Jun. 6, 2013

Related U.S. Application Data

(60) Provisional application No. 61/616,655, filed on Mar. 28, 2012.

(30) Foreign Application Priority Data

Oct. 11, 2011 (JP) .................. 2011-223956

(51) Int. Cl.
G01B 11/24 (2006.01)
G01B 11/25 (2006.01)

(52) U.S. Cl.
CPC .......... *G01B 11/24* (2013.01); *G01B 11/2527* (2013.01)

(58) Field of Classification Search
USPC ............................. 356/601–613
See application file for complete search history.

(56) References Cited

U.S. PATENT DOCUMENTS 6,556,307 B1 * 4/2003 Norita ................ G01B 11/2518
356/608
8,923,603 B2 * 12/2014 Weston ................ G01B 11/007
345/419

(Continued)

FOREIGN PATENT DOCUMENTS

JP 5-322559 12/1993
JP 2004-170509 6/2004

(Continued)

OTHER PUBLICATIONS

International Search Report, from the Japanese Patent Office in counterpart PCT Application No. PCT/JP2012/076219, dated Nov. 20, 2012.

(Continued)

*Primary Examiner* — Tri T Ton
(74) *Attorney, Agent, or Firm* — Finnegan, Henderson, Farabow, Garrett & Dunner, LLP

(57) ABSTRACT

There is provided a form measuring apparatus including: an imager configured to take an image of a object, an irradiator configured to irradiate a measurement light from a projection direction different from the direction along which the imager performs imaging to form a predetermined light amount distribution on the object, a reference light generator configured to generate a reference light to irradiate the object, and a detector configured to detect a target area for form measurement of the object based on a pickup image taken by the imager as the reference light is irradiated on the object.

29 Claims, 15 Drawing Sheets

(56) References Cited

U.S. PATENT DOCUMENTS

| | | | |
|---|---|---|---|
| 2006/0290945 A1 | 12/2006 | Kubo | |
| 2007/0133011 A1* | 6/2007 | Koh ..................... | G01B 11/25 356/604 |
| 2010/0008588 A1 | 1/2010 | Feldkhun et al. | |

FOREIGN PATENT DOCUMENTS

| | | |
|---|---|---|
| JP | 2006-64453 | 3/2006 |
| JP | 2007-3285 | 1/2007 |
| JP | 2007-304062 | 11/2007 |
| JP | 2007-333462 | 12/2007 |
| JP | 2009-8502 | 1/2009 |
| JP | 2009-058459 A | 3/2009 |
| JP | 2006-180689 | 8/2009 |
| JP | 2009-180689 | 8/2009 |
| JP | 2010-48604 | 3/2010 |
| JP | 2011-133306 | 7/2011 |
| WO | WO 2009/024756 | 2/2009 |

OTHER PUBLICATIONS

English-language Notification of Transmittal of Translation of the International Preliminary Report of Patentability issued by The International Bureau of WIPO in corresponding International Application No. PCT/JP2012/076219, dated Apr. 24, 2014 (16 pages).

English-language International Search Report issued by the Japanese Patent Office in corresponding International Application No. PCT/JP2011/076219, dated Feb. 14, 2012 (4 pages).

First Examination Report of Chinese Application No. 201280049826.6 dated Oct. 26, 2015 (9 pages).

Notice of Reasons for Rejection for Japanese Patent Application No. 2013-538555, dated Apr. 12, 2016 (4 pages).

Notice of Reasons for Rejection issued in counterpart Japanese Patent Application No. 2013-538555, dated Apr. 21, 2015, 12 pages.

Extended European Search Report issued in counterpart European Patent Application No. EP 12 84 0154, dated Jun. 26, 2015, 6 pages.

* cited by examiner

Fig. 4
(a)
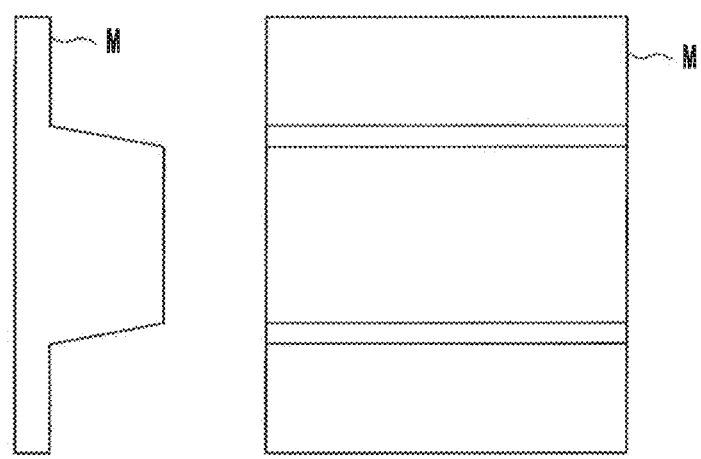
(b)
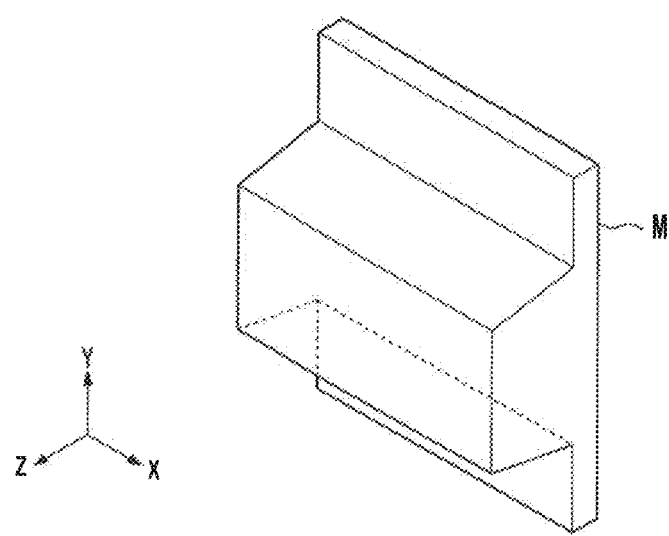

Fig. 6
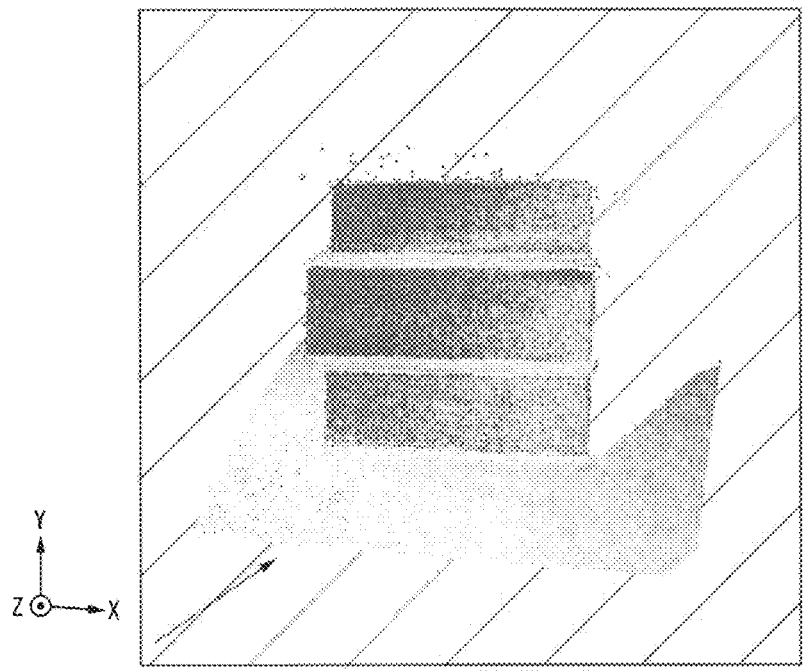
Fig. 7
(a) 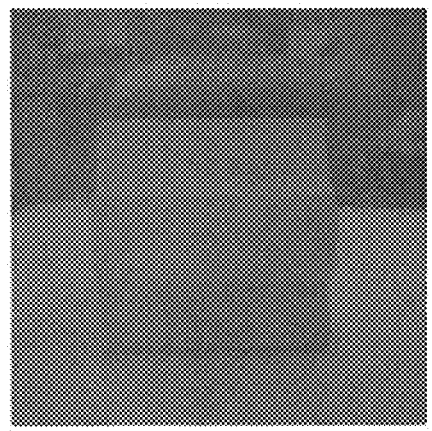   (b) 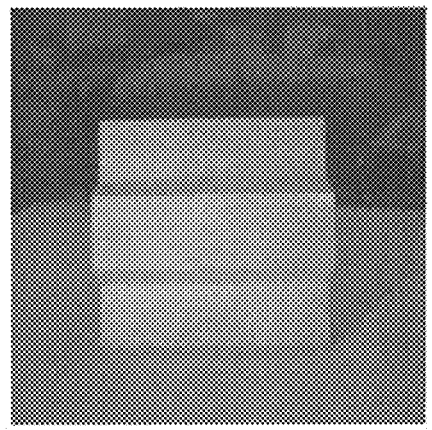

Fig. 8
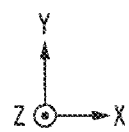
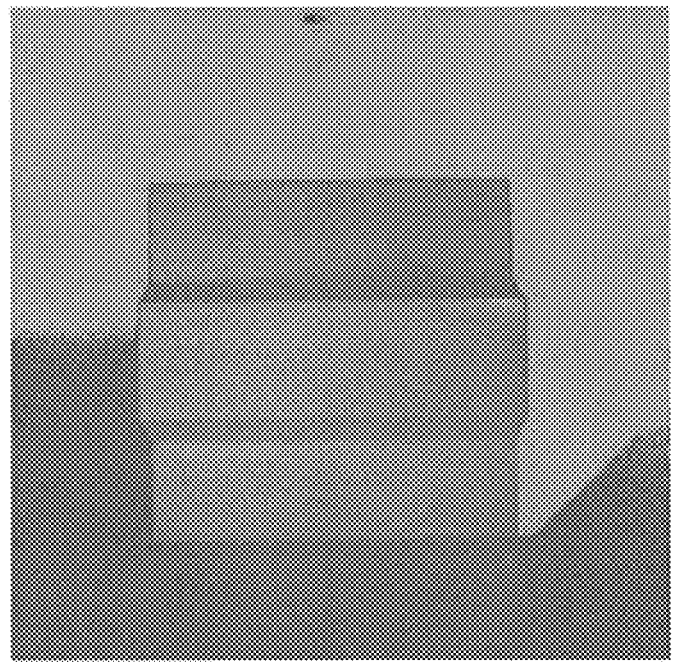

PROFILE MEASURING APPARATUS, STRUCTURE MANUFACTURING SYSTEM, METHOD FOR MEASURING PROFILE, METHOD FOR MANUFACTURING STRUCTURE, AND NON-TRANSITORY COMPUTER READABLE MEDIUM

CROSS REFERENCE TO RELATED APPLICATIONS

The present application claims priority from Japanese Patent Application No. 2011-223956 filed on Oct. 11, 2011, and U.S. Provisional Application No. 61/616,655 filed on Mar. 28, 2012, the disclosures of which are incorporated herein by reference in their entirety.

BACKGROUND

Field of the Invention

The present invention relates to a form measuring apparatus, a structure manufacturing system, a form measuring method, a method, for manufacturing a structure, and a non-transitory computer readable medium.

Description of the Related Art

As a technique of measuring surface form of a measuring object (three-dimensional form) in a non-contact manner, for example, there have been known form measuring apparatuses of a structured light projection type based on a phase shifting technique (for example, see Japanese Patent Application Laid-Open No. 2009-180689). Such a form measuring apparatus projects a structured light having a sinusoidal intensity distribution onto a measuring object, and repeatedly takes an image of the measuring object while shifting the phase of the structured light at a regular pitch. By applying a plurality of pickup images (brightness variation data) obtained through the above process to a predetermined computational expression, a phase distribution (phase image) of the structured light deformed according to the surface form of the measuring object is obtained, and converted into a height distribution (height image) of the measuring object after unwrapping the phase image (phase unwrapping). In this manner, the form measuring apparatus generates a three-dimensional form data of the measuring object from the plurality of obtained pickup images.

However, such a form measuring apparatus as described above can give rise to some portions with which a three-dimensional form data is not generable for a measuring object under some imaging conditions of the pickup images (the brightness variation data). In such a case, there is a problem that the form measurement should be carried out over again under a changed imaging condition.

SUMMARY

The present teaching is made for solving the above problem, and an object thereof is to provide a form measuring apparatus, a structural object producing system, a form measuring method, a structural object producing method, and a computer-readable medium with a recorded form measuring program, which are capable of efficient form measurement.

According to an aspect of the present teaching, there is provided a form measuring apparatus which measures a form of an object, including:

an imager configured to take an image of the object;

an irradiator configured to irradiate a measurement light from a projection direction different from a direction along which the imager performs imaging to form a predetermined light amount distribution on the object;

a reference light generator configured to generate a reference light to irradiate the object; and a detector configured to detect an target area for form measurement of the object based on a pickup image taken by the imager as the reference light is irradiated on the object.

BRIEF DESCRIPTION OF THE DRAWINGS

FIGS. 4A and 4B are configuration diagrams showing examples of a form of the measuring object in accordance with the first embodiment;

FIG. 6 is a schematic view showing an example of a result of calculating point cloud data in accordance with the first embodiment;

FIGS. 7A and 7B show examples of pickup images of imaging the measuring object irradiated with a reference light in accordance with the first embodiment;

FIG. 8 is a schematic view showing an example of a detection result obtained by a detection portion in accordance with the first embodiment;

DESCRIPTION OF THE EMBODIMENTS

First Embodiment

Referring to the accompanying drawings, a first embodiment of the present teaching will be explained.

Figure 1:
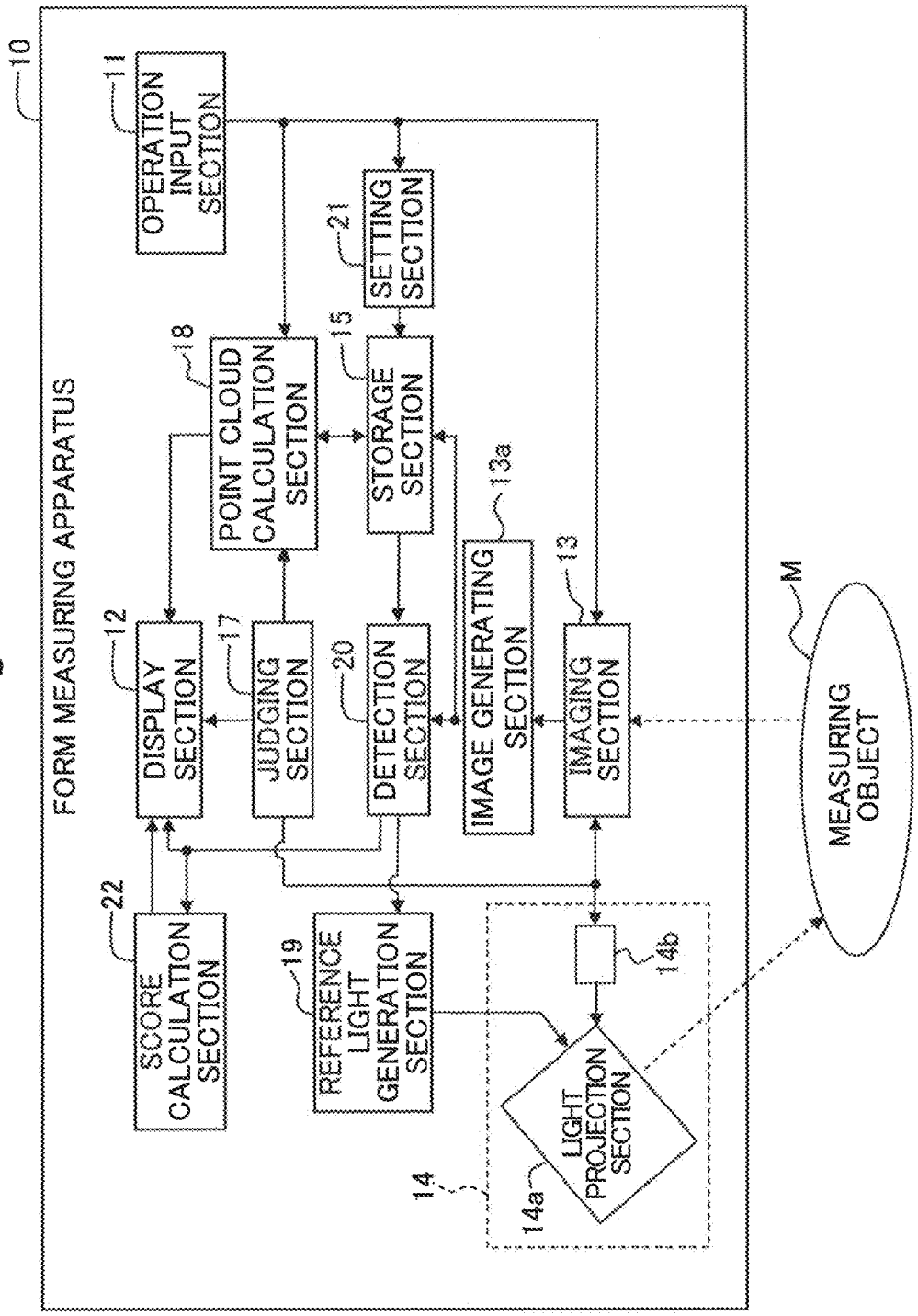
FIG. 1 is a block diagram showing a constructional example of a form measuring apparatus in accordance with a first embodiment of the present teaching.

FIG. 1 is a block diagram showing a construction of a form measuring apparatus 10 in accordance with the first embodiment of the present teaching. The form measuring apparatus 10 is a computer terminal which includes a operation input section 11, a display 12, an imager 13, an image generator 13a, an irradiator 14, a storage 15, a judging section 17, a point cloud calculator 18 (a point cloud data calculator), a reference light generator 19, a setting section 21, and a score calculator 22, and which is used to measure a three-dimensional form of a measuring object M by a phase shifting technique. In the first embodiment, based on an N-bucket method, the form measuring apparatus 10 changes the initial phase of a light which forms a pattern of fringe-like bright and dark lines (to be referred to as a structured light hereinafter), takes an image of the structured light formed on the measuring object M with each initial phase, and carries out form measurement of the measuring object M based on the signal intensity of an identical pixel in each image (for example, the luminance value or the like represented by the brightness value, MAX(R,G,B) value, etc.).

The operation input section 11 accepts input operations from a user. The operation input section 11 includes, for example, a power button for switching on and off the main power supply, and a operation member such as a release button or the like for accepting an instruction to start an imaging process. Further, the operation input section 11 can also accept, an instruction to set an aftermentioned threshold value, etc., by way of a touch panel. Further, the operation input section 11 accepts input operations corresponding to a half-push state and a full-push state, for example, by pushing the release button halfway and thoroughly. Here, the full-push state of the release button is such a state that the release button has been pushed in so as to reach a predetermined position, while the half-push state is such a state that the release button has been pushed in short of the position reached by the release button in the full-push state.

The imager 13 images or takes an image of the measuring object M (in the form of data), and outputs the imaged data as a raw data. With the data outputted from the imager 13, the image generator 13a carries out an imaging process to generate a pickup image of the image of the measuring object M taken by the imager 13, and store the generated pickup image into the storage 15. Further, the imager 13 operates along with the irradiator 14 to carry out the imaging process in line with the timing for the irradiator 14 to project an illumination light onto the measuring object M. In the first embodiment, the imager 13 generates a plurality of pickup images of imaging, at every initial phase, a plurality of structured lights formed on the measuring object M with different initial phases based on the N-bucket method due to the irradiator 14. Further, the imager 13 carries out the imaging process in line with the timing for the irradiator 14 to project a reference light onto the measuring object M to irradiate the measuring object M from a projection direction.

The irradiator 14 includes a light projector 14a and a measurement light generator 14b. At form measurement of the measuring object M, the measurement light generator 14b controls a light source controller 5 to modulate the light intensity of an light source provided in aftermentioned the light projector 14a. By virtue of this, the irradiator 14 irradiates the measuring object M with a measurement light from the projection direction different from the direction along which the imager 13 takes the image, i.e., from a different direction with the optical axis of the imager 13, such that the pickup image generated by the image generator 13a can be taken as an image of the structured light formed on the measuring object M. In particular, the irradiator 14 irradiates the measurement light to form a predetermined light amount distribution on the measuring object M. The predetermined light amount distribution formed on the measuring object M is such a distribution that the light amount changes periodically with its position on the measuring object M, for example, the light amount changes sinusoidally with the change of its position on the measuring object M. Further, the irradiator 14 irradiates the structured lights such that the imager 13 can sequentially take the images of the plurality of structured lights formed on the measuring object M to have a spatial frequency with a constant period and differ in initial phase by 90 degrees from each other based on the N-bucket method. Further, the light projector 14a of the first embodiment irradiates the reference light generated by the reference light generator 19. The measurement light and the reference light will be described hereinafter.

The storage 15 prestores a threshold value used to detect an area as a target area including pixels with a signal intensity difference (such as a brightness difference or the like) at the threshold value or above among every pixel in a pickup image. Further, the storage 15 stores the pickup images generated by the imager 13, the point cloud, data calculated by the point cloud calculator 18 (point cloud data calculator), etc.

The point cloud calculator 18 (point cloud data calculator) calculates the form of the measuring object M, and calculates the point cloud data having the coordinate value of each position of the measuring object M, based on the pickup images of the images of the measuring object M taken by the imager 13 to form the plurality of structured lights different in initial phase. Further, the point cloud calculator 18 carries out a point cloud calculation process for phase calculation, phase unwrapping and the like based on the plurality of pickup images of the measuring object M taken by the imager 13, so as to calculate the point cloud data and store the same into the storage 15.

The reference light generator 19 generates the reference light to irradiate the measuring object M from the projection direction. Further, the reference light generator 19 generates the reference light of the same light amounts as those mutually different light amounts in the predetermined light amount distribution formed on the measuring object M by the illumination light irradiated from the irradiator 14 and originated by the measurement light generator 14b. Further, the reference light is characterized by irradiating the measuring object M from a predetermined projection direction. Here, the predetermined projection direction is, for example, different from the direction along which the imager 13 takes the image. In the first embodiment, the reference light generator 19 generates the reference light of the same light amount as a first light amount and of the same light amount as a second light amount different from the first light amount among the mutually different light amounts in the predetermined light amount distribution formed on the measuring object M, so as to take the image of the structured light formed on the measuring object M. Here, as the reference light of the same light amount as the first light amount, for example, the reference light generator 19 generates the reference light of the maximum light amount in the predetermined light amount distribution formed on the measuring object M by the illumination light. Further, as the reference light of the same light amount as the second light amount, for example, the reference light generator 19 generates the reference light of the minimum light amount in the predetermined light amount distribution formed on the measuring object M by the illumination light. Further, the reference light generator 19 controls the irradiator 14 such that the light projector 14a can irradiate the reference light. That is, the light projector 14a irradiates the measurement light and the reference light, respectively.

Further, the abovedescribed first light amount and second light amount utilize the maximum and minimum light amounts, respectively, in the light amount range of the predetermined light amount distribution formed on the measuring object M. Alternatively, the first light amount and the second light amount can utilize any values of different light amounts other than the maximum and minimum light amounts in the light amount range of the predetermined light amount distribution. Still alternatively, the first light amount and the second light amount can be different light amounts from those in the predetermined light amount distribution.

A detector 20 detects the target area for form measurement of the measuring object M, based on the pickup image taken by the imager 13 as the reference light is irradiated on the measuring object M. Further, in detecting the target area for form measurement, the detector 20 utilizes the pickup image taken by the imager 13 as the reference light is irradiated on the measuring object M. Further, the detector 20 acquires the signal intensity of each area from the plurality of pickup images generated by the imager 13 every time the measuring object M is irradiated with the reference light with mutually different light amounts generated by the reference light generator 19, and detects the target area for form measurement of the measuring object M based on a magnitude relation of the signal intensities compared for every corresponding area between the plurality of pickup images. For example, the target area for form measurement of the measuring object M findable from the pickup image taken by the imager 13 with the measurement light (structured light) irradiated by the irradiator 14 is subject to change under the influence of the material, luminance, reflectivity and the like of the surface of the measuring object M. It is desirable, for example, for the imager 13 to take such a pickup image with the measurement light irradiated by the irradiator 14 that an area exposed to the measurement light is brightly imaged while an area unexposed to the measurement, light is darkly imaged. Here, in a case that the measuring object M is made of such a material that its surface almost does not reflect light, for example, then almost no difference will arise on the measuring object M between the brightness of the area exposed to the measurement light and the brightness of the area unexposed to the measurement light. In such a case, because form measurement of the measuring object M is not possible, such item is not included in the target area. In addition, it is also possible that the reflectivity is very high while only specular light arises from the measuring object M. In this case, because it is also possible to fail to obtain an image with a sufficient contrast provided by the irradiator 14, it is not possible to measure such item included in the target area.

Further, when the measurement light is irradiated, for example, because it is not possible to carry out form measurement of the measuring object M with any areas unexposed to the measurement light, i.e. any areas in shadow, such item is not included in the target area.

Further, the detector 20 acquires the signal intensity (e.g. the brightness value or the like) of predetermined pixels from the plurality of pickup images generated by the imager 13 every time the measuring object M is illuminated with the reference light with mutually different light amounts generated by the reference light generator 19, and detects the target area in which form measurement is performable at a predetermined accuracy from the pickup images taken by the imager as the measurement light is irradiated, based on the difference of signal intensities (e.g. the difference of brightness values or the like) compared for every corresponding pixel between the plurality of pickup images. Further, the detector 20 detects, as the target area, an area including pixels with the signal intensity difference (e.g. brightness difference or the like) being not lower than a threshold value stored in the storage 15. Further, the detector 20 detects the target area based on a first pickup image taken by imaging the measuring object M irradiated with the reference light of the same light amount as the first light amount among mutually different light amounts generated by the reference light generator 19, and a second pickup image taken by imaging the measuring object irradiated with the reference light of the same light amount as the second light amount different from the first light amount among the mutually different light amounts generated by the reference light generator 19. Further, the detector 20 detects the target area based on the light amounts of the reference light with the first light amount corresponding to the maximum light amount among the light amounts set in the measurement light, and with the second light amount corresponding to the minimum light amount among the light amounts set in the measurement light. Further, the detector 20 detects the target area with the reference light irradiated to conform to an irradiation area of the measurement light.

The setting section 21 sets a threshold value based on a command from the operation input section 11, and stores the set threshold value into the storage 15.

The score calculator 22 calculates a score based on the number of pixels included in the target area detected by the detector 20. Further, the score calculator 22 calculates another score based on the size of the area set to cover a plurality of pixels included in the target area detected by the detector 20. For example, the score calculator 22 calculates, as the score, the ratio of the number of pixels included in the target area detected by the detector 20 to the number of pixels in the pickup image taken by the imager 13. Further, the score calculator 22 generates information urging the user to change the imaging condition based on the calculated score. For example, in a case that the calculated score does not exceed a predetermined value, then the score calculator 22 causes the display 12 to display the information indicating that the target area detected by the detector 20 is narrow for that imaging condition. By virtue of this, the user can change the imaging condition by changing the position and/or direction of the form measuring apparatus 10, etc., to obtain the point cloud, data denoting a three-dimensional form of the measuring object M with a wider target area. Here, the information indicating that the target area detected by the detector 20 is narrow can be displayed, for example, either by characters or by figures such as arrows and the like. In this manner, with the form measuring apparatus 10 of the first embodiment, it is possible to efficiently carry out a form measurement operation.

The display 12 serves to display various kinds of information. In the first embodiment, the display 12 displays the target area detected by the detector 20 on the pickup image taken by the imager 13. Further, the display 12 displays such as the point cloud data and the like calculated by the point cloud calculator 18, denoting a three-dimensional form of the measuring object M. Further, the display 12 displays the scores calculated by the score calculator 22. Further, the display 12 displays the information generated by the score calculator 22, urging the user to change the imaging condition.

Next, referring to FIG. 2, explanations will be given for a detailed construction of the light projector 14a.

Figure 2:
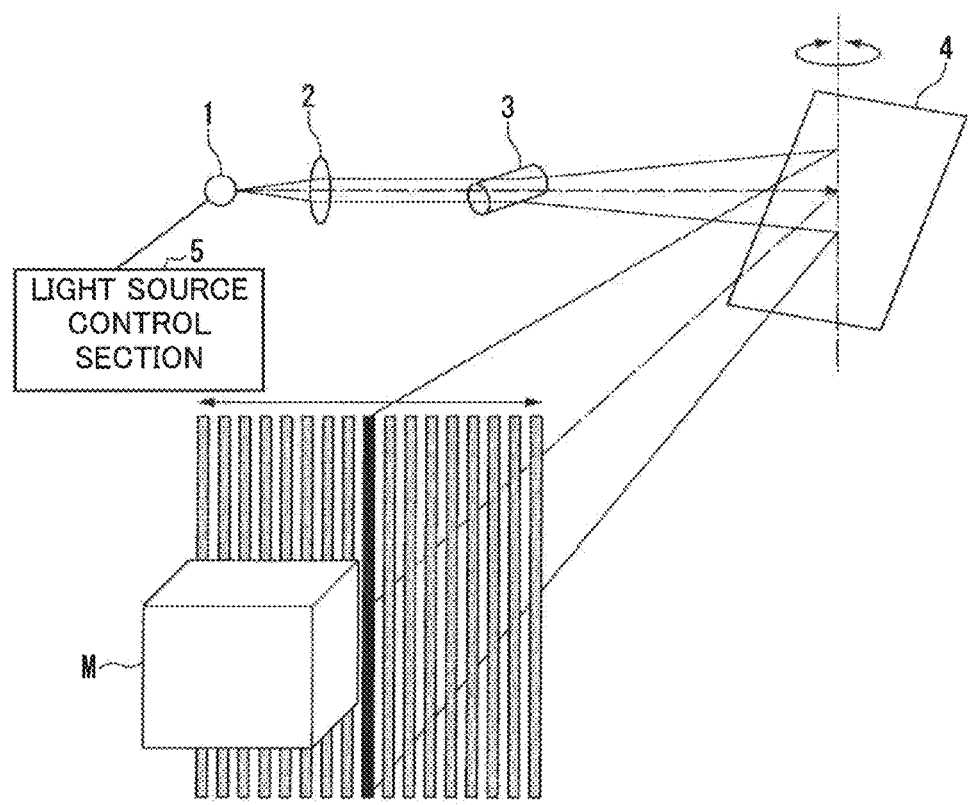
FIG. 2 is a configuration diagram showing an example of constructing an irradiation portion in accordance with the first embodiment.

FIG. 2 is a configuration diagram showing a construction of the light projector 14a.

For example, the light projector 14a has, as shown in FIG. 2, a light source 1, and a collimating lens 2 and a cylindrical lens 3 which convert the light intensity distribution into a linear intensity distribution with its longitudinal direction being perpendicular to the direction of radiating the light from the light source 1. Further, it includes a scan mirror 4 (MEMS (Micro Electro Mechanical Systems) mirror) which scans the measuring object M in a vertical direction by directing the linear light intensity distribution to the longitudinal direction of the light flux.

Further the light source 1 is provided with the light source controller 5 for controlling the light intensity of the light emitted from the light source 1 and, by letting the light source controller 5 modulate the intensity of a laser light (beam) while sequentially changing the deflection direction of the laser light with the scan mirror, the image taken by the imager 13 is obtained to be the same image as the structured light is formed on the measuring object M.

In other words, by shaping up the intensity distribution such that the laser light irradiated from the light source 1 can have a linear light intensity distribution in one direction vertical to the optical axis direction, and changing the deflection direction with the scan mirror while changing the intensity of the light having the linear intensity distribution (to be referred to as linear light hereinafter) in a vertical direction to both the optical axis direction and the longitudinal direction of the linear light intensity distribution, a fringe-like structured light is formed to have a periodical intensity change in the vertical direction to both the optical axis direction and the longitudinal direction of the linear light intensity distribution. Then, by letting the scan mirror scan a number of times to superpose the structured lights, a light amount distribution is formed on the measuring object M such that the light amount varies periodically with its position on the measuring object M. That is, by letting the scan mirror scan a number of times to accumulate the structured light intensities, the predetermined light amount distribution is formed on the measuring object M.

Here, it is also possible to form the pattern light with a sinusoidal intensity change, for example, by changing the deflection direction of the laser light with the scan mirror while modulating the intensity of the laser light. When the intensity change is sinusoidal, by letting the scan mirror scan a number of times, a light amount distribution is formed such that the light amount changes sinusoidally with its position on the measuring object M.

That is, at form measurement of the measuring object M, by radiating a linear light from the light projector 14a as the measurement light generated by the measurement light generator 14b, and changing the deflection direction with the scan mirror while modulating the intensity of the measurement light with the light source controller 5, the structured light is formed on the measuring object M. Then, by letting the scan mirror scan a number of times in a predetermined area on the measuring object M to superpose the formed pattern lights, the predetermined light amount distribution is formed.

Further, by letting the light source controller 5 change the timing of modulating the intensity of the laser light with respect to the deflection direction of the scan mirror, for example, to change the initial phase of the pattern of the structured light, the structured light is formed with a plurality of initial phases. In particular, in a case that the pattern light has a sinusoidal intensity distribution, then by letting the light source controller 5 change the timing of modulating the intensity of the laser light with respect to the deflection direction of the scan mirror to shift the initial phase of the sinusoidal wave of the sinusoidally changing intensity, the pattern light is formed with a plurality of initial phases.

Further, although the light amount distribution formed on the measuring object M is exemplified here as a distribution of a sinusoidal light amount change, it can also be non-sinusoidal. For example, in addition to distributions of periodical light amount changes such as in the form of a triangular wave, a rectangular wave or the like, distributions of a random light amount change are also possible.

Further, the example shown here is that the pattern light has a sinusoidal intensity distribution. However, the pattern light can also have non-sinusoidal intensity distributions such as in the form of a triangular wave, a rectangular wave or the like in accord with the light amount distribution formed on the measuring object M, or even have a random intensity distribution.

Further, when a predetermined light amount distribution is formed on the measuring object M, then the pattern light can be formed on the measuring object M with any kind of intensity distribution to superpose the lights. For example, the structured light formed on the measuring object M can have a different intensity distribution at each scan by the scan mirror.

Further, the example shown here is that the structured light is formed by utilizing the scan mirror to scan by a linear light. However, it is also possible to apply a liquid crystal projector and the like to project the structured light. When using a liquid crystal projector, it is possible to collectively form the structured light (i.e. the measurement light) without light scanning as carried out by the scan mirror.

Figure 3:
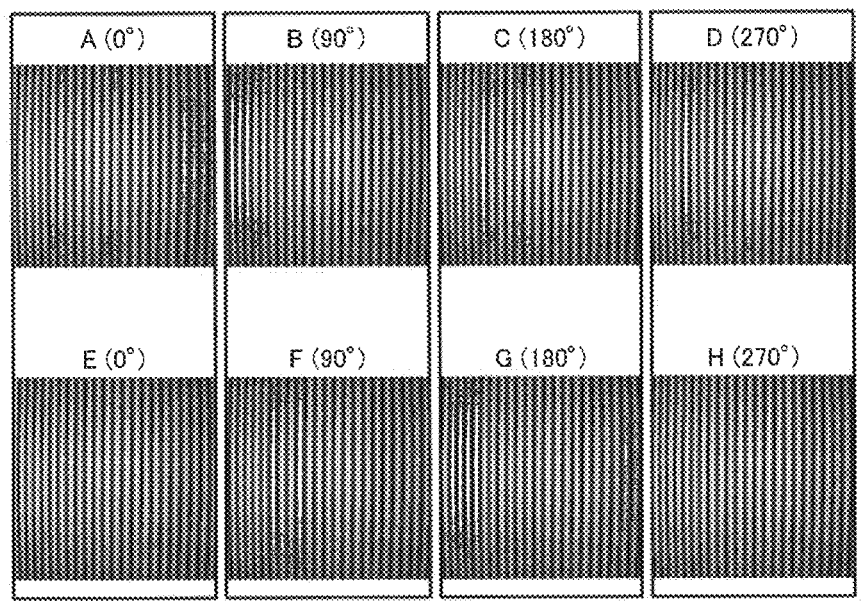
FIG. 3 is a schematic view showing an example of a measuring object with pattern lights formed by shifting the initial phase 90 degrees at a time with the irradiation portion in accordance with the first embodiment.

FIG. 3 shows an example of the measuring object M on which the irradiator 14 has formed pattern lights by shifting the initial phase 90 degrees at a time. Here, there are shown a structured light A of the pattern of which initial phase is 0 degrees, a structured light B of the pattern of which initial phase is shifted 90 degrees from that of the structured light A, a structured light C of the pattern of which initial phase is shifted 180 degrees from that of the structured light A, and a structured light D of the pattern of which initial phase is shifted 270 degrees from that of the structured light A. Further, there are also shown here a structured light E of the pattern of which initial phase is 0 degrees, a structured light F of the pattern of which initial phase is shifted 90 degrees from that of the structured light E, a structured light G of the pattern of which initial phase is shifted 180 degrees from that, of the structured light E, and a structured light H of the pattern of which initial phase is shifted 270 degrees from that of the structured light E. For example, when the 5-bucket method is used, then five pickup images are generated from the structured light A to the structured light E; while in a case that the 7-bucket method is used, then seven pickup images are generated from the structured light A to the structured light G. Here, it is not necessarily indispensable that the images are taken in the order of structured light A, structured light B, structured light C, structured light D, and structured light E, but it is possible to take the images, for example, in the order of structured light A, structured light E, structured light B, structured light C, and structured light B. In the first embodiment, however, suppose the imaging process is carried out while shifting the initial phase in the order of structured light A, structured light B, structured light C, structured light D, and structured light E. That is, among a plurality of imaging timings of taking images of the structured lights formed on measuring object M with an identical initial phase (such as the structured light A and structured light E), the imager 13 takes images of the structured lights formed on the measuring object M with other initial phases (such as the structured light B, structured, light C and structured light D).

Next, refer ring to FIGS. 4A, 4B, through 6, an example of calculating point, cloud data will be explained.

FIGS. 4A and 4B show examples of a form of the measuring object M.

The measuring object M of the first embodiment has a lateral form and a frontal form shown in FIG. 4A. This measuring object M has another (partial) form shown in FIG. 4B. The form measuring apparatus 10 of the first embodiment measures the (total) form of the measuring object M including those partial forms shown in FIGS. 4A and 4B.

Figure 5:
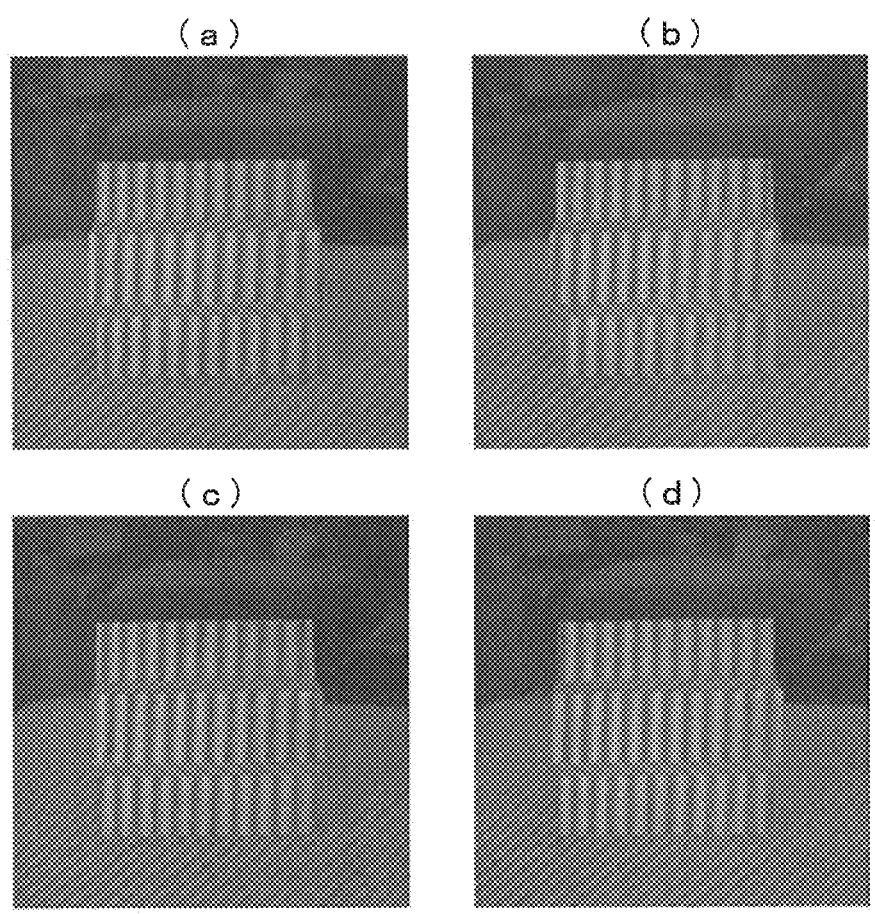
FIGS. 5A to 5D are schematic views showing examples of the measuring object with the pattern lights formed in accordance with the first embodiment.

FIGS. 5A to 5D show the images when the structured lights shown in FIG. 3 are formed on the measuring object M of the first embodiment shown in FIGS. 4A and 4B. That is, the irradiator 14 irradiates light as the measurement light from the projection direction different from the direction along which the imager 13 takes the images of the structured lights formed on the measuring object M as described above, so as to form a predetermined light amount distribution on the measuring object M. In particular, the predetermined light amount distribution formed on the measuring object M is such a distribution that the light amount changes periodically with its position on the measuring object M, for example, the irradiated light amount changes sinusoidally with the change of its position on the measuring object M. In other words, the irradiator 14 irradiates the measurement light to illuminate with the light changing in light intensity with its position on the measuring object M. Here, FIG. 5A shows that the measuring object M is irradiated with the structured light A or the structured light E. Further, FIG. 5B shows that the measuring object M is irradiated with the structured light B or the structured light F. Likewise, FIG. 5C shows that the measuring object M is irradiated with the structured light C or the structured light G while FIG. 5D shows that the measuring object M is irradiated with the structured light D or the structured light H. The form measuring apparatus 10 of the first embodiment images the measuring object M irradiated with the respective structured lights shown in FIGS. 5A to 5D.

In this manner, the measurement light is applied to illumination so as to be imaged as images of the structured lights formed on the measuring object M.

FIG. 6 shows a result of calculating the point cloud data.

In the form measuring apparatus 10 of the first embodiment, the point cloud calculator 18 (point cloud calculator) calculates the point cloud data as shown in FIG. 6, based on the pickup images taken by imaging the measuring object M irradiated with the respective structured lights shown in FIGS. 5A to 5D.

In this manner, the point cloud calculator 13 calculates the point cloud data, and causes the display 12 to display the image based on the calculated point cloud data. Here, in FIG. 6, the measurement light (structured light) is irradiated in a direction from the left-hand near side to the right-hand far side on the page, i.e. in the direction of the arrow shown in FIG. 6. By radiating the measurement light from this direction, the area screened from the measurement light by the measuring object M is in shadow, and thus becomes the area for which the point cloud calculator 18 cannot calculate the point cloud data. Further, in FIG. 6, the hatched part shows the area for which the point cloud calculator 18 cannot calculate the point cloud data. That is, the unmatched part in FIG. 6 is the target area for form measurement of the measuring object M, findable from the pickup image taken by the imager 13 with the measurement light irradiated by the irradiator 14.

Next, referring to FIGS. 7A, 7B, and 8, explanations will be given about the reference light generator 19 and the detector 20.

FIGS. 7A and 7B show pickup images taken by imaging the measuring object M irradiated with reference light.

As described hereinbefore, the reference light generator 19 generates the reference light to have the same light amount as the first light amount among the mutually different light amounts in the light amount distribution formed on the measuring object M by the measurement light. Further, the reference light generator 19 generates the reference light to have the same light amount as the second light amount different from the first light amount in the light amount distribution formed on the measuring object M by the measurement light.

The light projector 14a irradiates the measuring object M with the reference light of the same light amount as the second light amount, generated by the reference light generator 19 (see FIG. 7A). Further, the light projector 14a irradiates the measuring object M with the reference light of the same light amount as the first light amount, generated by the reference light generator 19 (see FIG. 7B).

FIG. 8 shows a detection result obtained by the detector 20.

As described hereinbefore, the detector 20 detects the target area based on a first pickup image taken by imaging the measuring object M irradiated with the reference light of the same light amount as the first light amount, and a second pickup image taken by imaging the measuring object M irradiated with the reference light of the same light amount as the second light amount. For example, the detector 20 detects the unhatched part in FIG. 8 as the target area findable from the pickup images for form measurement of the measuring object M.

Comparing FIG. 8 with FIG. 6 described previously, it is understood that the detection result shown in FIG. 8 is in agreement with the calculation result of point cloud data shown in FIG. 6, i.e. the form measurement result. That is, before calculating the point cloud data, the form measuring apparatus 10 of the first embodiment can detect such a target area, as is usable to calculate the point cloud data, for form measurement of the measuring object M. As shown in FIGS. 5A to 5D described previously, in order to calculate point cloud data, in the 4-bucket method for example, it is necessary to form four types of structured lights on the measuring object M, i.e. the structured light A, structured light B, structured light C and structured light D, for taking the pickup images corresponding to the respective imaged structured lights. Moreover, because the form measuring apparatus 10 of the first embodiment can detect the target area usable to calculate point cloud data for form measurement of the measuring object M before calculating the point cloud data, it is possible to efficiently carry out the form measurement.

Next, referring to FIGS. 9 to 11, explanations will be given for examples of operation of the form measuring apparatus 10 in accordance with the first embodiment.

Figure 9:
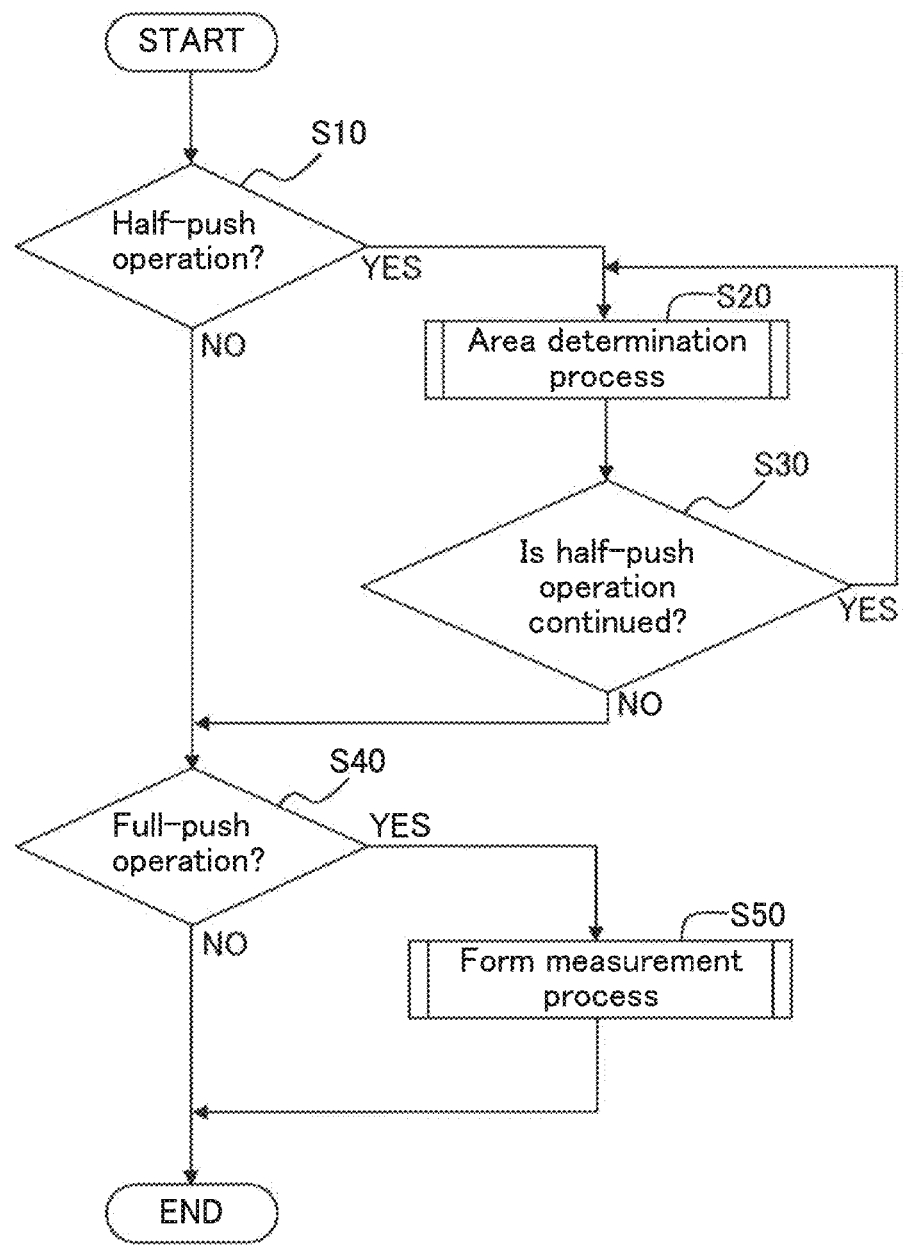
FIG. 9 is a flowchart showing an example of operation of the form measuring apparatus in accordance with the first embodiment.

FIG. 9 is a flowchart showing an operation of the form measuring apparatus 10 carrying out an area determination process and a form measurement process.

The operation input section 11 accepts input operations from a user. For example, the operation input section 11 accepts an input operation with the release button being half-pushed or full-pushed (step S10). On accepting a input operation with the release button being half-pushed, the operation input section 11 lets the process proceed to step S20 (step S10: YES) to carry out the area determination process. On the other hand, when having determined that there is no input operation with the release button being half-pushed, the operation input section 11 lets the process proceed to step S40 (step S10: NO).

In step S20, the detector 20 carries out the area determination process, which will be described hereinafter.

Next, the operation input section 11 determines whether or not the input operation is continued with the release button being half-pushed (step S30). When having determined that the input operation is continued with the release button being half-pushed, the operation input section 11 lets the process return to step S20 to continue the area determination process (step S30: YES). That is, while the user is continuing to input the command signal commanding to irradiate the reference light, in order to let the reference light generator 19 repeatedly irradiate the reference light, and let the detector 20 detect the target area at each input of the pickup image irradiated with the reference light, the operation input section 11 lets the area determination process continue. On the other hand, when having determined that the input operation is not continued with the release button being half-pushed, the operation input section 11 lets the process proceed to step S40 (step S30: NO).

Then, on accepting an input operation with the release button being full-pushed, the operation input section 11 lets the process proceed to step S50 (step S40: YES) to carry out the form measurement process. On the other hand, when having determined that there is no input operation with the release button being full-pushed, the operation input section 11 ends the process (step S40: NO).

Descriptions will be made hereinafter about the form measurement process carried out in step S50. When step S50 is over, the detector 20 ends the process.

Next, referring to FIG. 10, explanations will be given for an example of operation of the form measuring apparatus 10 in accordance with the first embodiment.

Figure 10:
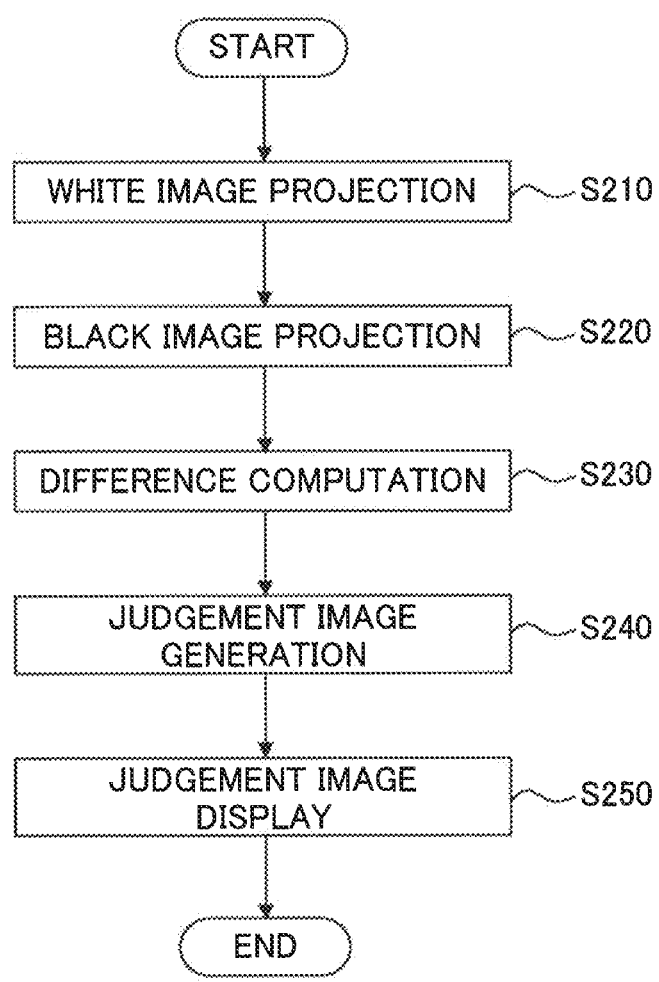
FIG. 10 is a flowchart showing an example of operation of an area determination process carried out by the form measuring apparatus in accordance with the first embodiment.

FIG. 10 is a flowchart showing an operation of the form measuring apparatus 10 carrying out the area determination process.

As described above, the form measuring apparatus 10 carries out the area determination process in step S20.

First, the reference light generator 19 generates the reference light to have the same light amount as the first light amount, and irradiates the measuring object M with the generated reference light through the light projector 14a. Then, the imager 13 generates the first pickup image by imaging the measuring object M irradiated with the reference light, and lets the storage 15 store the generated first pickup image (step S210). Here, the first light amount is, for example, the maximum light amount in the light amount distribution which is formed on the measuring object M by radiating the measurement light with the irradiator 14 in the aftermentioned form measurement process, and in which the light amount changes sinusoidally with its position on the measuring object M. The pickup image of the measuring object M irradiated with such a reference light (the first pickup image) is a whitish image (white image) as shown in FIG. 7B.

Next, the reference light generator 19 generates the reference light to have the same light amount as the second light amount, and irradiates the measuring object M with the generated reference light through the light projector 14a. Then, the imager 13 generates the second pickup image by imaging the measuring object M irradiated with the reference light, and lets the storage 15 store the generated second pickup image (step S220). Here, the second light amount is, for example, the minimum light amount in the light amount distribution which is formed on the measuring object M by radiating the measurement light with the irradiator 14 in the aftermentioned form measurement process, and in which the light amount varies sinusoidally with its position on the measuring object M. The pickup image of the measuring object M irradiated with such a reference light (the second pickup image) is a blackish image (black image) as shown in FIG. 7A.

Next, the detector 20 reads out the first pickup image (i.e. the white image) and the second pickup image (i.e. the black image) stored in the storage 15, obtains the signal intensity (e.g. the brightness value) of each pixel from the readout pickup images, and calculates the signal intensity difference between the respective pixels for every pixel between the plurality of pickup images (step S230).

Next, the detector 20 reads out (from the storage 15) the threshold value prestored into the storage 15 from the operation input section 11 through the setting section 21. Then, the detector 20 creates a judgment image based on the result of comparing the readout threshold value with the signal intensity difference calculated in step S230 for every pixel (step S240). Here, the judgment image is the image shown in FIG. 8 described previously. In the first embodiment, when the calculated signal intensity difference is not less than the readout threshold value, for example, then the detector 20 determines that it is in the form-measurable target area. On the other hand, when the calculated signal intensity difference is less than the readout threshold value, for example, then the detector 20 determines that it is not in the form-measurable target range. The detector 20 creates the judgment image by, for example, hatching the part which is determined as not in the form-measurable target area (see FIG. 8).

Next, the display 12 lets the display 12 display the judgment image created in step S240, and ends the process (step S250).

In this manner, the form measuring apparatus 10 lets the display 12 display the judgment image which has determined the form-measurable target area, and the form-unmeasurable target area.

Next, referring to FIG. 11, explanations will be given for an example of operation of the form measuring apparatus 10 carrying out the form measurement process.

Figure 11:
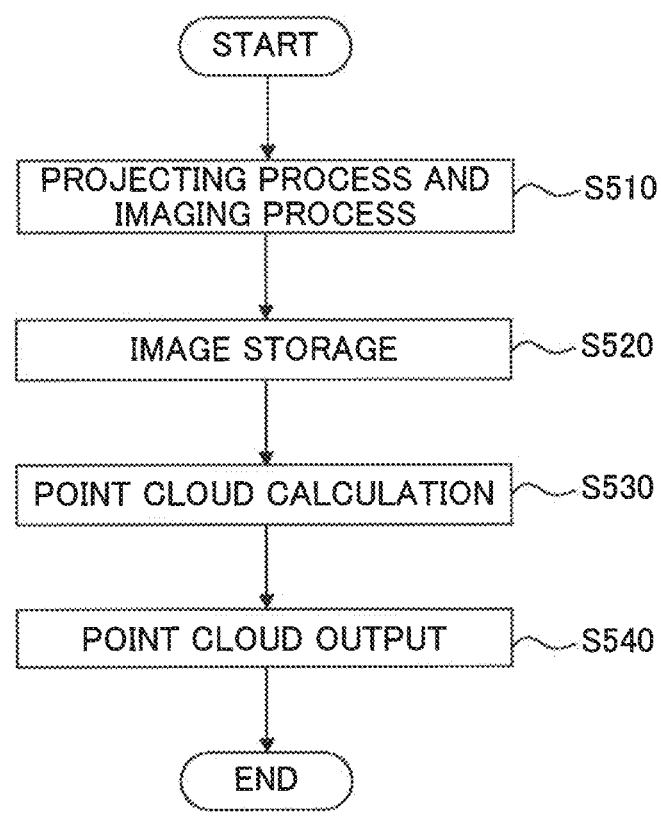
FIG. 11 is a flowchart showing an example of operation of a form measurement process carried out by the form measuring apparatus in accordance with the first embodiment.

FIG. 11 is a flowchart showing the operation of the form measuring apparatus 10 carrying out the form measurement process.

The imager 13 starts the process of imaging the measuring object M and, accordingly, the irradiator 14 starts the process of projecting the measurement light onto the measuring object M (step S510). Here, the irradiator 14 carries out the process of projecting the measurement light to form, on the measuring object M, a light amount distribution in which the light amount changes sinusoidally with its position on the measuring object M. Further, the imager 13 lets the storage 15 store five pickup images taken at the time of forming the structured lights of which initial phases are, for example, 0 degrees, 90 degrees, 180 degrees, 270 degrees, and 360 degrees (step S520).

Next, the point cloud calculator 18 calculates the point cloud data based on the pickup images stored in the storage 15, and lets the storage 15 store the calculated result (step S530). Then, the display 12 displays the calculated point cloud data, and ends the process (step S540).

As explained above, the form measuring apparatus 10 of the first embodiment includes the imager 13 generating a pickup image by imaging the measuring object M. Further, the form measuring apparatus 10 includes the irradiator 14 radiating the measurement light to form a predetermined light amount distribution on the measuring object M, from the projection direction different from the direction along which the imager 13 takes the image such that the pickup image generated by the imager 13 is taken as an image of the structured light formed on the measuring object M. Here, the predetermined light amount distribution formed on the measuring object M is, for example, such a distribution that the light amount changes periodically with its position on the measuring object M. In other words, the irradiator 14 irradiates the measurement light to illuminate with the light differing in light intensity (i.e. structured light) with its position on the measuring object M. Further, the form measuring apparatus 10 includes the reference light generator 19 generating the reference light for irradiating the measuring object M from the projection direction, and the detector 20 detecting the target area for form measurement of the measuring object M, findable from the pickup image taken by the imager 13 with the irradiator 14 radiating the measurement light based on the plurality of pickup images taken by the imager 13 as the reference light is projected on the measuring object M. By virtue of this, even when the imaging condition undergoes various changes due to the measuring object M and measuring environment, and there are areas of failing to generate a three-dimensional data (point cloud data) of the measuring object M, the form measuring apparatus 10 of the first embodiment can still predetermine the areas of failing to generate a three-dimensional data (point cloud data) before carrying out the form measurement process. That is, because the form measuring apparatus 10 of the first embodiment can carry out the area determination process before the form measurement process, it is possible to efficiently carry out the form measurement operation.

Further, the reference light generator 19 of the form measuring apparatus 10 of the first embodiment controls the light projector 14a to generate the reference light of the same light amount as those mutually different light amounts in the predetermined light amount distribution formed on the measuring object M by radiating the measurement light in the form measurement process. By virtue of this, because the form measuring apparatus 10 of the first embodiment can suffice the imaging conditions for the form measurement process and the area determination process, it is possible to increase the degree of coincidence between the area in which the three-dimensional data is generable in the form measurement process, and the area in which the three-dimensional data is generable in the area determination process. Therefore, it is possible to efficiently carry out the form measurement operation.

Further, the form measuring apparatus 10 of the first embodiment includes the display 12 displaying the target area detected by the detector 20 on the pickup image taken by the imager 13. By virtue of this, the user can immediately confirm the resultant image of the area determination process. Therefore, the form measuring apparatus 10 of the first embodiment can efficiently carry out the form measurement operation.

Further, the detector 20 of the form measuring apparatus 10 of the first embodiment acquires the signal intensity of each pixel from the plurality of pickup images generated by the imager 13 every time the measuring object M is irradiated with the reference light with mutually different light amounts set by the reference light generator 19, and detects the target area based on the difference of signal intensities compared for every pixel between the plurality of pickup images. By virtue of this, because the form measuring apparatus 10 of the first embodiment can detect the target area by only computing the signal intensity difference without performing complicated computation, it is possible to reduce the time and electric power needed for the computation.

Further, other than comparing the signal intensities of every pixel from the plurality of pickup images, it is also possible to compare average values of the signal intensities in an identical area of the plurality of pickup images.

Further, the form measuring apparatus 10 of the first embodiment includes the storage 15 storing a threshold value, and the detector 20 detects such a target range as includes pixels of which the signal intensity difference or the signal intensity is not less than the threshold value among every pixel of the pickup images. By virtue of this, because the form measuring apparatus 10 of the first embodiment can detect the target range by only computing the difference of signal intensities compared with the predetermined threshold value without performing complicated computation, it is possible to reduce the time and electric power needed for the computation.

Further, the form measuring apparatus 10 of the first embodiment includes the setting section 21 setting the threshold value. By virtue of this, the form measuring apparatus 10 of the first embodiment can set the threshold value while reducing the difference among the results of detecting the target area, arising from the different conditions of the measuring object M, measuring environment and the like. That is, the form measuring apparatus 10 can increase the degree of coincidence between the area in which the three-dimensional data is generable in the form measurement process, and the area in which the three-dimensional data is generable in the area determination process. Therefore, it is possible to efficiently carry out the form measurement operation.

Further, the form measuring apparatus 10 of the first embodiment includes the score calculator 22 calculating the score based on the number of pixels included in the target area detected by the detector 20. By virtue of this, the form measuring apparatus 10 of the first embodiment can quantify the favorability of the result of determining the area in which the three-dimensional data is generable in the area determination process. Therefore, it is possible to efficiently carry out the form measurement operation.

Further, the score calculator 22 of the form measuring apparatus 10 of the first embodiment generates information urging the user to change the imaging condition based on the calculated score.

The imaging condition mentioned here can be exemplified in terms of the following: the shutter speed (exposure time), the posture of the form measuring apparatus with respect to the measuring object M, the F number of the imaging optical system of the imager, the intensity of the structured light image due to the irradiator 14, and the like. For example, when the measuring object is a mirror surface, a glossy surface, or a shiny surface, then a distinct difference of signal intensity is less likely to occur between the two events of irradiation with the first light amount (for example, the maximum light amount in the light amount distribution) and irradiation with the second light amount (for example, the minimum light amount in the light amount distribution) in a predetermined light amount distribution formed on the measuring object M by the measurement light. In such cases, by changing the posture of the form measuring apparatus 10, it is possible to expand the area in which the three-dimensional data is generable. Further, by changing the exposure time and/or the intensity of the structured light image, it is likewise possible to expand the area. By virtue of this, the form measuring apparatus 10 of the first embodiment can notify the user of the favorability of the result of determining the scope in which the three-dimensional data is generable in the area determination process, independent of the image and value in the determination result. Therefore, with the form measuring apparatus 10 of the first embodiment, it is possible to efficiently carry out the form measurement operation.

The detector 20 of the form measuring apparatus 10 of the first embodiment detects the target area based on the first pickup image taken by imaging the measuring object M irradiated with the reference light of the same light amount as the first light amount among mutually different light amounts in a predetermined light amount distribution formed on the measuring object M, and the second pickup image taken by imaging the measuring object M irradiated with the reference light of the same light amount as the second light amount different from the first light amount among the mutually different light amounts. By virtue of this, because the form measuring apparatus 10 of the first embodiment can detect the target area with two pickup images, compared with the case of detecting the target area with three pickup images or more, it is possible to reduce the time required for taking images. Therefore, it is possible to efficiently carry out the form measurement operation.

Further, the detector 20 of the form measuring apparatus 10 of the first embodiment detects the target area based on the reference light with the first light amount corresponding to the maximum light amount and with the second light amount corresponding to the minimum light amount in a predetermined light amount distribution formed on the measuring object by the measurement light. By virtue of this, because the form measuring apparatus 10 of the first embodiment can increase the signal intensity difference between the respective pixels of the two pickup images, it is possible to set the threshold value more easily in the area determination process. Therefore, it is possible to efficiently carry out the form measurement operation.

Further, the detector 20 of the form measuring apparatus 10 of the first embodiment detects the target area with the reference light irradiated to conform to the irradiation area of the measurement light (the formation area of the structured light). By virtue of this, because the form measuring apparatus 10 of the first embodiment can suffice the imaging conditions for the form measurement process and the area determination process, it is possible to increase the degree of coincidence between the area in which the three-dimensional data is generable in the form measurement process, and the area in which the three-dimensional data is generable in the area determination process. Therefore, it is possible to efficiently carry out the form measurement operation.

Further, the reference light generator 19 of the form measuring apparatus 10 of the first embodiment controls the light projector 14a of the irradiator 14 to let the light projector 14a irradiate the reference light. By virtue of this, because the form measuring apparatus 10 of the first embodiment need not include another projector (another irradiator) for irradiating the reference light, it is possible to reduce the size and weight of the form measuring apparatus 10.

Further, although the reference light generator 19 and the measurement light generator 14b are described as separate mechanisms in the form measuring apparatus of the first embodiment, it is possible to realize the two mechanisms with an identical control circuit in practice.

Further, the form measuring apparatus 10 of the first embodiment has the point cloud calculator 18 (point cloud data calculator) which calculates the form of the measuring object M, and calculates the point cloud data having the coordinate value of each position of the measuring object M, based on the pickup images of the measuring object M taken by the imager 13 to form a plurality of structured lights different in initial phase. By virtue of this, because the form measuring apparatus 10 of the first embodiment can carry out the area determination process and the form measurement process with the one form measuring apparatus 10, it is possible to efficiently carry out the form measurement operation.

Further, the form measuring apparatus 10 of the first embodiment lets the reference light generator 19 repeatedly irradiate the reference light until the user inputs the command signal commanding the point cloud calculator 18 (point cloud data calculator) to calculate point cloud data, and lets the detector 20 detect the target area at each input of the pickup image irradiated with the reference light. By virtue of this, because the user can operate the form measuring apparatus 10 of the first embodiment to repeat the area determination process, it is possible to change the imaging condition while confirming the result of the area determination process until a acceptable imaging condition is obtained. Therefore, with the form measuring apparatus 10 of the first embodiment, it is possible to efficiently carry out the form measurement operation.

Further, the detector 20 of the form measuring apparatus 10 of the first embodiment can also detect the target area based on a contrast of the pickup image taken by imaging the measuring object M irradiated with the reference light. Here, the contrast of the pickup image is the signal intensity difference between adjacent pixels among every pixel of the pickup image. For example, when the measuring object M is nearly a flat surface, then the form measuring apparatus 10 of the first embodiment detects the target area by detecting the contrast of one pickup image. By virtue of this, because the form measuring apparatus 10 of the first embodiment can detect the target range with one pickup image, compared with the case of detecting the target area with two pickup images or more, it is possible to reduce the time required for taking images. Therefore, it is possible to efficiently carry out the form measurement operation.

Further, the detector 20 of the form measuring apparatus 10 of the first embodiment can also detect the target area with the reference light irradiated to a narrower irradiation area than the irradiation range of the measurement light (the formation range of pattern right). By virtue of this, because a small number of pixels become the objects of the area determination process, the form measuring apparatus 10 of the first embodiment can reduce the time required for the area determination process. Therefore, with the form measuring apparatus 10 of the first embodiment, it is possible to efficiently carry out the form measurement operation.

Further, as described previously from steps S230 to S250 of FIG. 10, the detector 20 of she form measuring apparatus 10 of the first embodiment determines the target area for form measurement of the measuring object M, based on the signal intensity difference of predetermined corresponding pixels between the pickup images taken of the measuring object M under the irradiated reference light with the first light amount (e.g. the maximum light amount in a predetermined light amount distribution formed on the measuring object M by the measurement light) and with the second light amount (e.g. the minimum light amount in the predetermined light amount distribution). However, it is also possible not to apply two types of light amounts to the reference light. For example, it is also possible to apply either three types or more of light amounts or only one type of light amount to the reference light.

If one type of light amount is applied to the reference light, then for example, the target area for form measurement of the measuring object M is determined based on the image taken by the imager 13 as the reference light with one type of light amount is irradiated on the measuring object M. In this case, the light amount of the reference light can be, for example, either the maximum light amount or the minimum light amount in a predetermined light amount distribution formed on the measuring object M by the measurement light.

In a case that the maximum light amount is taken to be the light amount of the reference light, then the target area for form measurement of the measuring object M is determined based on a magnitude relation of the signal intensity of a predetermined pixel in the image of the measuring object M generated by irradiating the reference light. The magnitude relation refers to, for example, a comparison between the threshold value read out from, the storage 15, and the signal intensity of a predetermined pixel in the image of the measuring object M generated by irradiating the reference light. The target area for form measurement of the measuring object M is determined based on this comparison. At this time, the threshold value stored in the storage 15 is, for example, the saturated signal intensity for the imager 13 (for the maximum detectable light amount). On the other hand, in a case that the minimum light amount is taken to be the light amount of the reference light, then the target area for form measurement of the measuring object M is determined likewise. At this time, the threshold value stored in the storage. 15 is, for example, the signal intensity for the minimum light amount detectable by the imager 13.

Further, the abovementioned threshold value can be set in an arbitrary manner. It can be set either at a suitable value as default for the form measuring apparatus 10 or at an arbitrary value inputted by a user. By using the reference light with one type of light amount in this manner, it is possible to carry out the area determination process in a shorter time than by using the reference light with a plurality of different types of light amounts. Therefore, it is possible to efficiently carry out the form measurement operation.

Second Embodiment

Next, referring to FIG. 12, a second embodiment of the present teaching will be explained. However, explanations will be omitted for the same constructions and operations as those explained in the first embodiment.

Figure 12:
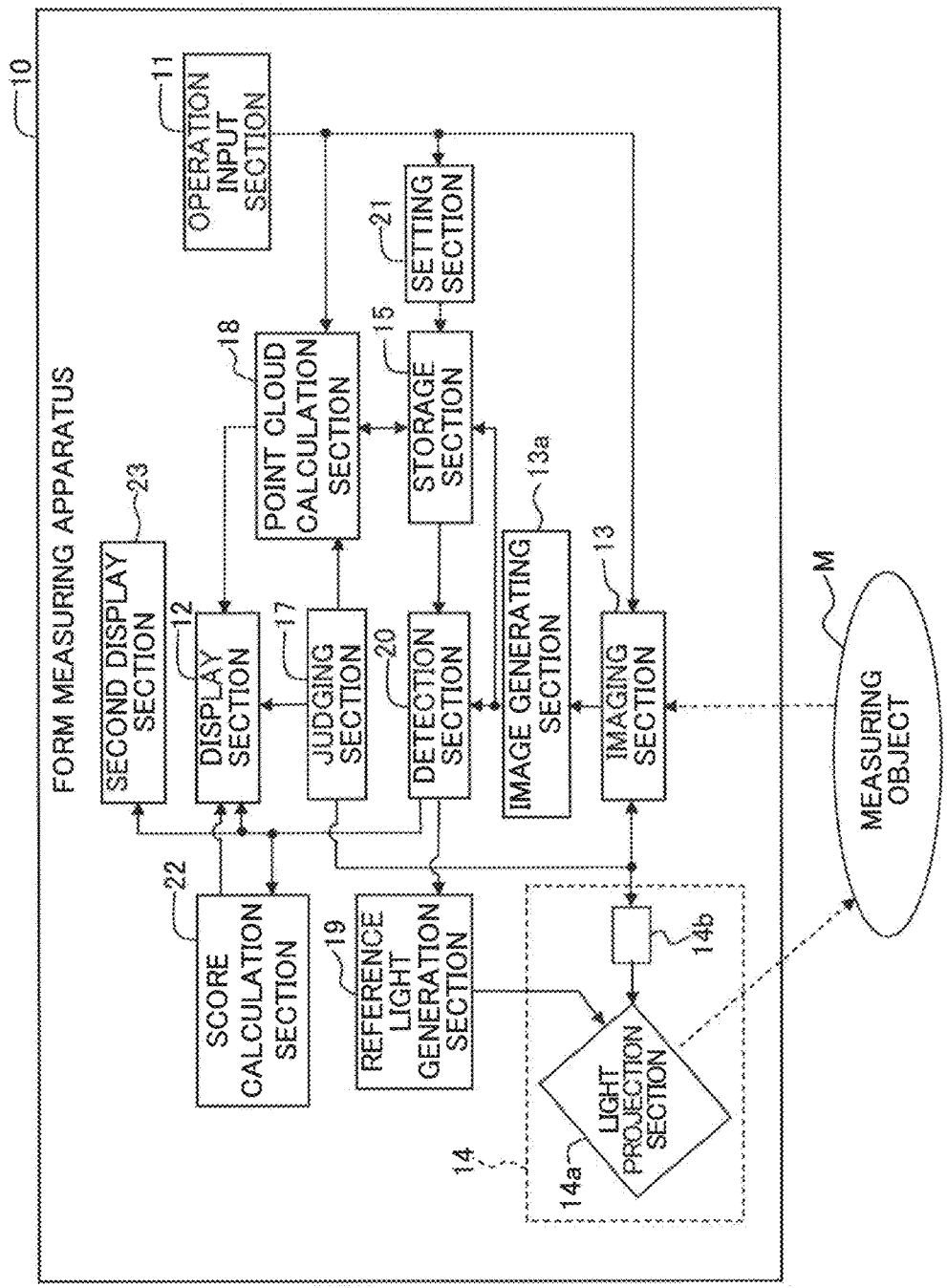
FIG. 12 is a block diagram showing a constructional example of a form measuring apparatus in accordance with a second embodiment of the present teaching.

FIG. 12 shows the construction of a form measuring apparatus 10 as an example in accordance with the second embodiment of the present teaching.

The form measuring apparatus 10 of the second embodiment includes a second display 23 displaying the target area according to a display status corresponding to a degree of accuracy.

The detector 20 detects the degree of accuracy denoting the certainty of a form measurement result for each pixel of the pickup image based on the signal intensity difference, and controls the degree as the target area to be separate under each measuring condition. For example, the detector 20 causes the second display 23 to display according to each measuring condition by changing the luminance and/or hue to correspond to the degree of accuracy denoting the certainty of a form measurement result based on the signal intensity difference. Here, the degree of accuracy denoting the certainty of a form measurement result is such an associated value that the greater the signal intensity difference, the higher the degree of accuracy, whereas the smaller the signal intensity difference, the lower the degree of accuracy. By virtue of this, the second display 23 displays the information such as images and the like showing the target area, not by a two-valued item such as with or without hatching and the like as explained in the foregoing first embodiment, but by a multi-valued item such as with luminance, hue and the like. Therefore, there is more information in the result of determining the target area, whereby it is possible to correctly inform the user of the imaging condition. That is, with the form measuring apparatus 10 of the second embodiment, it is possible to efficiently carry out the form measurement operation.

Further, the detector 20 of the form measuring apparatus 10 of the second embodiment can also detect the target area based on a contrast of the pickup image taken by imaging the measuring object M irradiated with the reference light. Here, the contrast of the pickup image is the signal intensity difference between adjacent pixels among every pixel of the pickup image. For example, when the measuring object M is nearly a flat surface, then the form measuring apparatus 10 of the second embodiment can detect the target area by detecting the contrast of one pickup image. By virtue of this, because the form measuring apparatus 10 of the second embodiment can detect the target area with one pickup image, compared with the case of detecting the target area with two pickup images or more, it is possible to reduce the time required for taking images. Therefore, it is possible to efficiently carry out the form measurement operation.

Further, the detector 20 of the form measuring apparatus 10 of the second embodiment can also detect the target area with the reference light irradiated to a narrower irradiation area than the irradiation area of the measurement light. By virtue of this, because a small number of pixels become the objects of the area determination process, the form measuring apparatus 10 of the second embodiment can reduce the time required for the area determination process. Therefore, with the form measuring apparatus 10 of the second embodiment, it is possible to efficiently carry out the form measurement operation.

Third Embodiment

Next, a third embodiment of the present teaching will be explained. However, explanations will be omitted for the same constructions and operations as those explained in the first embodiment and in the second embodiment.

The reference light generator 19 included, in the form measuring apparatus 10 of the third embodiment generates the reference light to form the same light amount distribution on the measuring object M as the predetermined light amount distribution formed on the measuring object M by the measurement light. At this time, as the reference light, it is possible to irradiate the measuring object M either with a light of the same intensity distribution as the structured light formed on the measuring object M by the measurement light or with a light of different intensity distribution therefrom. On the other hand, the detector 20 acquires a pickup image as the reference light is irradiated, and detects the target area with the pickup image. For example, the reference light generator 19 generates the reference light for irradiation to be imaged as images formed with the structured lights shown in FIGS. 5A to 5D, instead of the reference lights shown in FIGS. 7A and 7B explained in the first embodiment. By virtue of this, because the form measuring apparatus 10 of the third embodiment can increase the degree of coincidence between the area in which the three-dimensional data is generable in the form measurement process, and the area in which the three-dimensional data is generable in the area determination process, it is possible to efficiently carry out the form measurement operation.

Further, the reference light generator 19 of the third embodiment can also control the irradiator 14 and the imager 13 to let the imager 13 take a plurality of images of structured lights formed on the measuring object M with a plurality of patterns different in initial phase. Further, the detector 20 of the third embodiment can also detect the target area based on an accumulated quantity of accumulating the signal intensity of each pixel in the plurality of pickup images taken by the imager 13 to form the structured light with the pattern of each initial phase on the measuring object M for every corresponding pixel between the plurality of pickup images.

By virtue of this, the form measuring apparatus 10 of the third embodiment can detect, the target area with an accumulated value of a smaller computation amount compared with that needed for generating the three-dimensional data in the form measurement process. That is, because the form measuring apparatus 10 of the third embodiment can increase the degree of coincidence between the area in which the three-dimensional data is generable in the form measurement process, and the area in which the three-dimensional data is generable in the area determination process, it is possible to efficiently carry out the form measurement operation. Further, because the form measuring apparatus 10 of the third embodiment can detect the target area without performing complicated computation, it is possible to reduce the time and electric power needed for the computation.

Further, the detector 20 of the form, measuring apparatus 10 of the third embodiment can also detect the target area based on a contrast of the pickup image taken by imaging the measuring object M irradiated with the reference light. Here, the contrast of the pickup image is the signal intensity difference between adjacent pixels among every pixel of the pickup image. For example, when the measuring object M is nearly a flat surface, then the form measuring apparatus 10 of the third embodiment can detect the target area by detecting the contrast of one pickup image. By virtue of this, because the form measuring apparatus 10 of the third embodiment can detect the target area with one pickup image, compared with the case of detecting the target area with two pickup images or more, it is possible to reduce the time required for taking images. Therefore, it is possible to efficiently carry oat the form measurement operation.

Further, the detector 20 of the form measuring apparatus 10 of the third embodiment can also detect the target area with the reference light irradiated to a narrower irradiation area than the irradiation area of the measurement light. By virtue of this, because a small number of pixels become the objects of the area determination process, the form measuring apparatus 10 of the third embodiment can reduce the time required for the area determination process. Therefore, with the form measuring apparatus 10 of the third embodiment, it is possible to efficiently carry out the form measurement operation.

Fourth Embodiment

Next, referring to FIG. 13, a fourth embodiment of the present teaching will be explained. However, explanations will be omitted for the same constructions and operations as those explained in the first embodiment through the third embodiment.

Figure 13:
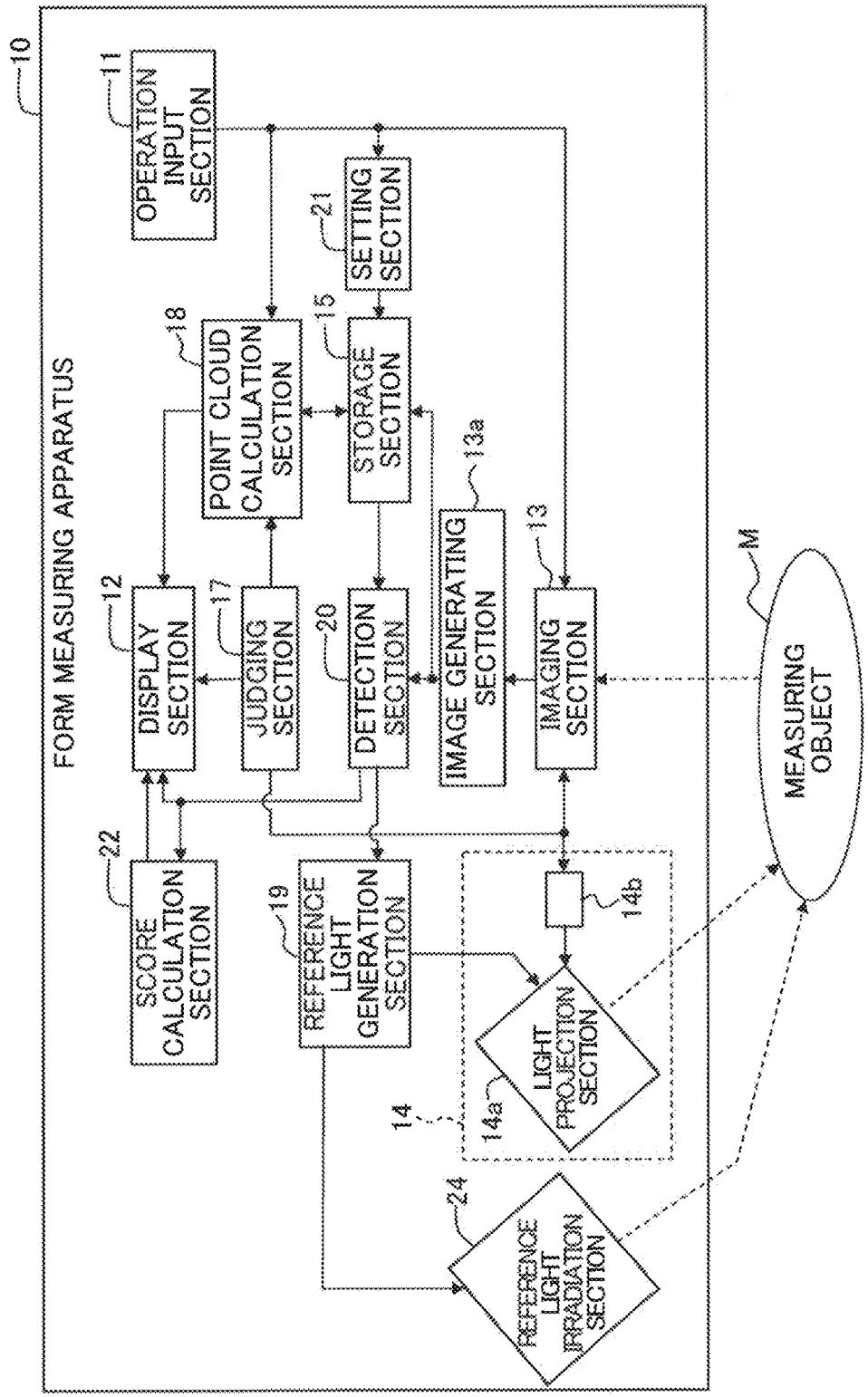
FIG. 13 is a block diagram showing a constructional example of a form measuring apparatus in accordance with a fourth embodiment of the present teaching.

FIG. 13 shows the construction of a form measuring apparatus 10 as an example in accordance with the fourth embodiment of the present teaching.

The form measuring apparatus 10 of the fourth embodiment includes a reference light projector 24 irradiating the measuring object M with the reference light under the control of the reference light generator 19. By virtue of this, the form measuring apparatus 10 of the fourth embodiment can irradiate the reference light with an irradiator suitable and dedicated for radiating the reference light. That is, the form measuring apparatus 10 can irradiate the reference light capable of increasing the degree of coincidence between the area in which the three-dimensional data is generable in the form measurement process, and the area in which the three-dimensional data is generable in the area determination process. Therefore, with the form measuring apparatus 10 of the fourth embodiment, it is possible to efficiently carry out the form measurement operation.

Fifth Embodiment

Next, referring to FIG. 14, a fifth embodiment of the present teaching will be explained. However, explanations will be omitted for the same constructions and operations as those explained in the first embodiment through the fourth embodiment.

Figure 14:
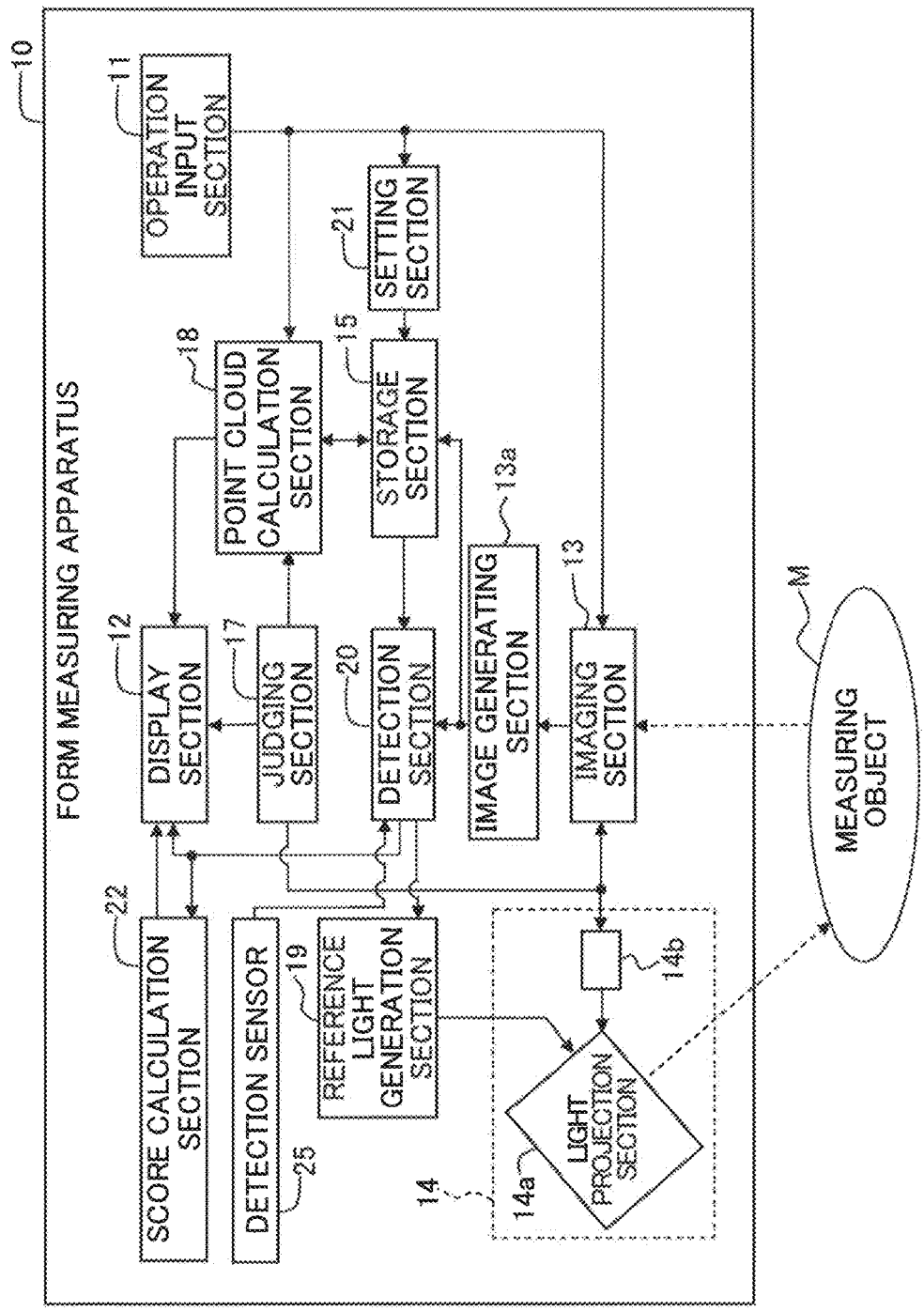
FIG. 14 is a block diagram showing a constructional example of a form measuring apparatus in accordance with a fifth embodiment of the present teaching.

FIG. 14 shows the construction of a form measuring apparatus 10 as an example in accordance with the fifth embodiment of the present teaching.

The form measuring apparatus 10 of the fifth embodiment includes a detection sensor 25 detecting the posture of the irradiator 14.

The detection sensor 25 is, for example, an angular speed sensor detecting the posture (position) of the form measuring apparatus 10.

The reference light generator 19 irradiates the reference light repeatedly every time the detector 20 has detected a changed output signal of the detection sensor 25.

The detector 20 detects the target area in the area determination process every time a pickup image irradiated with the reference light is inputted.

By virtue of this, the form measuring apparatus 10 of the fifth embodiment can carry out the area determination process without any user's operation when displacing the posture (position) of the form measuring apparatus 10, for example, so as to let the user change the imaging condition to obtain a preferable area determination result. Therefore, with the form measuring apparatus 10 of the fifth embodiment, it is possible to efficiently carry out the form measurement operation.

Sixth Embodiment

Next, explanations will be given for a structural object producing system utilizing the form measuring apparatus 10 of the foregoing embodiments, and a structural object producing method.

Figure 15:
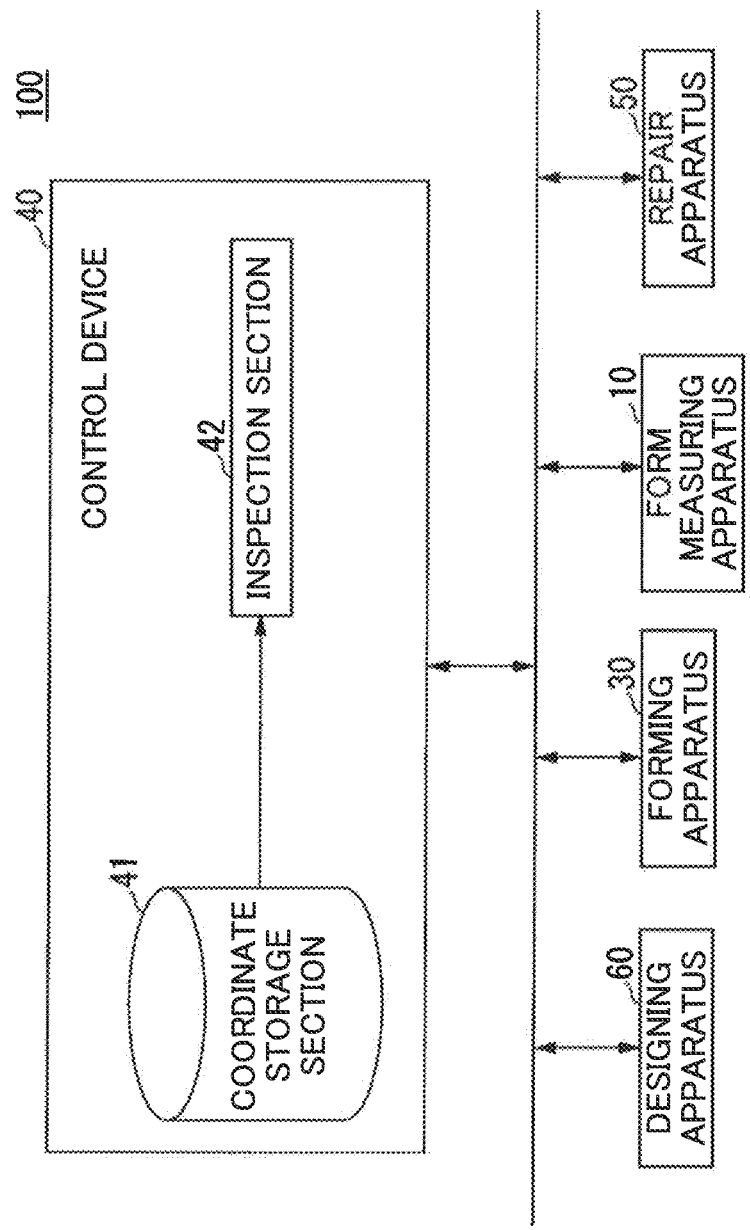
FIG. 15 is a block diagram showing a constructional example of a form measuring apparatus in accordance with a sixth embodiment of the present teaching.

FIG. 15 shows a construction of a structural object producing system 100. The structural object producing system 100 of the sixth embodiment includes the form measuring apparatus 10 as described in the foregoing embodiments, a design apparatus 60, a forming apparatus 30, a control apparatus 40 (inspection apparatus), and a repair apparatus 50. The control apparatus 40 includes a coordinate storage section 41 and an inspection section 42.

The design apparatus 60 creates design information with respect to the form of a structural object, and sends the created design information to the forming apparatus 30. Further, the design apparatus 60 causes the coordinate storage section 41 of the control apparatus 40 to store the created design information. The design information includes information indicating the coordinates of each position of the structural object.

The forming apparatus 30 fabricates the abovementioned structural object based on the design information inputted from the design apparatus 60. The formation process by the forming apparatus 30 includes such as casting, forging, cutting, and the like. The form measuring apparatus 10 measures the coordinates of the fabricated structural object (measuring object) and sends the information indicating the measured coordinates (form information) to the control apparatus 40. Further, the structural object mentioned here is the measuring object of the form measuring apparatus 10.

The coordinate storage section 41 of the control apparatus 40 stores the design information. The inspection section 42 of the control apparatus 40 reads out the design information from the coordinate storage section 41. The inspection section 42 compares the information indicating the coordinates (form information) received from the form measuring apparatus 10 with the design information read out from the coordinate storage section 41. Based on the comparison result, the inspection section 42 determines whether or not the structural object is formed in accordance with the design information. In other words, the inspection section 42 determines whether or not the fabricated structural object is nondefective. When the structural object is not formed in accordance with the design information, then the inspection section 42 determines whether or not the structural object is repairable. When the structural object is repairable, then the inspection section 42 calculates the defective sections and repairing amount based on the comparison result, and sends the information indicating the defective sections and the information indicating the repairing amount to the repair apparatus 50.

The repair apparatus 50 processes the defective sections of the structural object based on the information indicating the defective sections and the information indicating the repairing amount received from the control apparatus 40.

Figure 16:
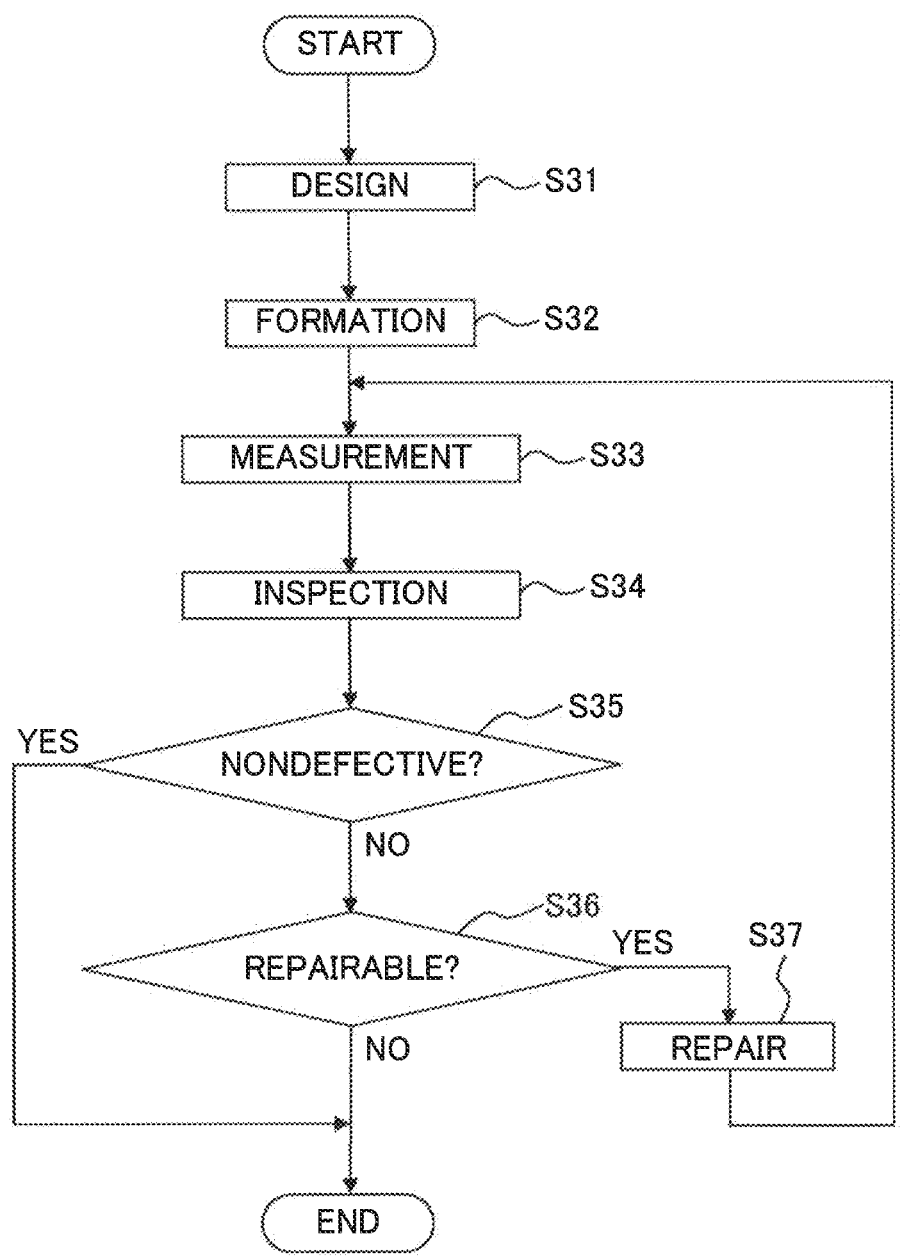
FIG. 16 is a flowchart showing an example of a structural object producing method in accordance with the sixth embodiment.

FIG. 16 is a flowchart showing the structural object producing method of the sixth embodiment. In the sixth embodiment, each apparatus of the structural object producing system 100 carries out each process of the structural object producing method shown in FIG. 16.

In the structural object producing system 100, first, the design apparatus 60 creates design information with respect to the form of a structural object (step S31). Next, the forming apparatus 30 fabricates the structural object based on the design information (step S32). Then, the form measuring apparatus 10 measure the form of the fabricated structural object (step S33). Then, the inspection section 42 of the control apparatus 40 inspects whether or not the structural object is fabricated in accordance with the design information by comparing the form information obtained by the form measuring apparatus 10 with the design information (step 334).

Then, the inspection section 42 of the control apparatus 40 determines whether or not the fabricated structural object is nondefective (step S35). When the inspection section 42 has determined the fabricated structural object to be nondefective (step S35: YES), then the structural object producing system 100 ends the process. On the other hand, when the inspection section 42 has determined the fabricated structural object to be defective (step S35: NO), then it determines whether or not the fabricated structural object is repairable (step S36).

When the inspection section 42 has determined the fabricated structural object to be repairable (step S36: YES), then the repair apparatus 50 carries out a repair process or reprocess on the structural object (step S37), and the structural object producing system 100 returns the process to step 333. When the inspection section 42 has determined the fabricated structural object to be unrepairable (step S36: NO), then the structural object producing system 100 ends the process.

With the structural object producing system 100 of the sixth embodiment, because the form measuring apparatus 10 of the foregoing embodiments can correctly measure the coordinates of a structural object, it is possible to determine whether or not the fabricated structural object is nondefective. Further, when the structural object is defective, then the structural object producing system 100 can carry out a reprocess on the structural object to repair the same.

Further, the repair process carried out by the repair apparatus 50 in the sixth embodiment can be replaced by a process letting the forming apparatus 30 carry out the formation process over again. In such a case, when the inspection section 42 of the control apparatus 40 has determined the structural object to be repairable, then the forming apparatus 30 carries out the formation process (forging, cutting, and the like) over again. In particular, for example, the forming apparatus 30 carries out a cutting process on the sections of the structural object which should have undergone cutting but have not. By virtue of this, it becomes possible for the structural object producing system 100 to fabricate the structural object correctly.

Referring to the accompanying drawings, several embodiments of the present teaching have been described above in detail. However, no specific constructions should be limited to these embodiments, and changes can be made as appropriate without departing from the spirit, of the present teaching.

Further, "controller CONT" will be used hereinbelow as an inclusive term to include the form measuring apparatus 10, control apparatus 40, forming apparatus 30, repair apparatus 50 and design apparatus 60 in each of the abovementioned embodiments. This controller CONT or each part included in this controller CONT can be realized either by dedicated hardware or by a microprocessor and memory.

Further, the controller CONT or each part included in the controller CONT can be realized by dedicated hardware or, alternatively, the controller CONT or each part included in the controller CONT can be constructed of a CPU (Central Processing Unit) and memory while its function is realized by loading a program into the memory and executing the same for realizing the function of the controller CONT or each part included in the controller CONT.

Further, it is possible to carry out the process of the controller CONT or each part included in the controller CONT by recording a program for realizing the function of the controller CONT or each part included in the controller CONT into a computer-readable recording medium, letting a computer system read in the program recorded in the recording medium, and executing the same. Further, the term "computer system" used here is supposed to include an OS (Operating System), and hardware such as peripheral equipment and the like.

Further, if the "computer system" utilizes a WWW (World Wide Web) system, then it is supposed to also include a website provision environment (or a display environment).

Further, the "computer-readable recording medium" refers to a portable medium such as flexible disks, magnetic optical disks, ROM, CD-ROM, etc., or a storage device such as hard disks built in the computer system, etc. Further, the "computer-readable recording medium" is supposed to include also devices which dynamically retain a program during a short time such as communication wires at transmission of the program via communication lines such as a network (e.g. the Internet), telephone lines, etc., and devices which retain a program for a certain period of time such as volatile memory inside the computer system acting as a server or a client in the current case. Further, the above-mentioned program can be such a program as to realize part of the function described above, or even such a program as is able to realize the function described above in combination with another program prerecorded in the computer system.

What is claimed is:

1. A form measuring apparatus which measures a form of an object, comprising:
   an imager configured to take an image of the object;
   an irradiator configured to irradiate a measurement light from a projection direction different from a direction along which the imager performs imaging to form a predetermined light amount distribution on the object;
   a reference light generator configured to generate a reference light to irradiate the object;
   a detector configured to detect a target area being an area failing to generate three-dimensional data or being an area able to generate three-dimensional data of the object based on a pickup image taken by the imager as the reference light is irradiated on the object; and
   a form calculator configured to make a calculation of the three-dimensional data of the object based on the image of the object which is taken by the imager as the object is irradiated by the measurement light, wherein the pickup image, that is taken by the imager as the reference light is irradiated on the object, is not used in the calculation of the three-dimensional data of the object.

2. The form measuring apparatus according to claim 1, wherein the predetermined light amount distribution is such a distribution that light amount changes periodically with a position on the object.

3. The form measuring apparatus according to claim 1, wherein the object is irradiated with the reference light from the projection direction.

4. The form measuring apparatus according to claim 3, wherein the detector utilizes the pickup image taken by the imager as the reference light is projected on the object in detecting the target area.

5. The form measuring apparatus according to claim 1, wherein the reference light generator generates the reference light of a same light amount as a light amount in the light amount distribution.

6. The form measuring apparatus according to claim 5, wherein the light amount of the reference light is the same light amount as a maximum light amount or a minimum light amount in the light amount distribution.

7. The form measuring apparatus according to claim 1, wherein the detector detects the target area based on a magnitude relation of signal intensity of a predetermined pixel in the pickup image generated by the imager as the object is irradiated with the reference light.

8. The form measuring apparatus according to claim 1, wherein the reference light generator generates the reference light to irradiate the object with the reference light of a same light amount as one of different light amounts included in the light amount distribution.

9. The form measuring apparatus according to claim 1, further comprising a display configured to display the target area detected by the detector on the pickup image taken by the imager.

10. The form measuring apparatus according to claim 1, wherein the detector obtains the signal intensity of a predetermined pixel from the pickup image including a plurality of pickup images generated by the imager at a time when the object is irradiated with the reference light with each light amount of different light amounts set by the reference light generator, and detects the target area based on a magnitude relation of signal intensity compared for each corresponding pixel between the plurality of pickup images.

11. The form measuring apparatus according to claim 7, wherein the detector detects a degree of accuracy denoting certainty of a form measurement result for each pixel of the pickup image based on the signal intensity, and separates the degree of accuracy as the target area under each measuring condition.

12. The form measuring apparatus according to claim 11, further comprising a second display configured to display the target area according to a display status corresponding to the degree of accuracy.

13. The form measuring apparatus according to claim 7, further comprising a storage configured to store a threshold value, wherein the detector detects, as the target area, an area including pixels with the signal intensity being not lower than the threshold value among predetermined pixels in the pickup image.

14. The form measuring apparatus according to claim 10, further comprising a storage configured to store a threshold value, wherein the detector detects, as the target area, an area including pixels with the signal intensity being not lower than the threshold value among predetermined pixels in the pickup image.

15. The form measuring apparatus according to claim 13, further comprising a setting section configured to set the threshold value.

16. The form measuring apparatus according to claim 14, further comprising a setting section configured to set the threshold value.

17. The form measuring apparatus according to claim 1, further comprising a score calculator configured to calculate a score based on the number of pixels, or the size of an area set to cover a plurality of pixels, included in the target range detected by the detector.

18. The form measuring apparatus according to claim 17, wherein the score calculator generates information urging a user to change the imaging condition based on the calculated score.

19. The form measuring apparatus according to claim 1, wherein the detector detects the target area based on a first pickup image taken by imaging the object irradiated with the reference light of the same light amount as a first light amount among mutually different light amounts in the light amount distribution, and a second pickup image taken by imaging the object irradiated with the reference light of the same light amount as a second light amount different from the first light amount among the mutually different light amounts in the light amount distribution.

20. The form measuring apparatus according to claim 19, wherein the first light amount corresponds to a maximum light amount among the mutually different light amounts in the light amount distribution, while the second light amount corresponds to a minimum light amount among the mutually different light amounts in the light amount distribution.

21. The form measuring apparatus according to claim 1, wherein the reference light generator controls the irradiator to irradiate the reference light such that the same light amount distribution is formed on the object as the light amount distribution formed on the object by the measurement light; and the detector obtains a pickup image as the reference light is projected, and detects the target area with the pickup image.

22. The form measuring apparatus according to claim 21, wherein the reference light generator controls the irradiator to form a structured light with a predetermined intensity distribution on the object, and change the initial phase of pattern of the structured light; and the detector detects the target area based on an accumulation amount which has accumulated the signal intensities of predetermined pixels in a plurality of pickup images taken by the imager with a plurality of structured lights different in initial phase respectively formed on the object for each corresponding pixel between the plurality of pickup images.

23. The form measuring apparatus according to claim 1, wherein the detector detects the target area based on a contrast of the pickup image taken by imaging the object irradiated with the reference light.

24. The form measuring apparatus according to claim 1, wherein the detector detects the target area with the reference light irradiated to conform to an irradiation area of the measurement light.

25. The form measuring apparatus according to claim 1, wherein the detector detects the target area with the reference light irradiated over an irradiation area narrower than that of the measurement light.

26. The form measuring apparatus according to claim 1, wherein the reference light generator controls the irradiator such that the irradiator irradiates the reference light.

27. The form measuring apparatus according to claim 1, further comprising a reference light projector configured to irradiate the reference light, wherein the object is irradiated with the reference light from the reference light projector under the control of the reference light generator.

28. The form measuring apparatus according to claim 1, wherein the reference light generator repeatedly irradiates the reference light while a user is continuing to input a command signal commanding to irradiate the reference light, and the detector detects the target area at each input of the pickup image irradiated with the reference light.

29. The form measuring apparatus according to claim 1, further comprising a detection sensor detecting posture of the irradiator, wherein the reference light generator repeatedly irradiates the reference light at a time when the detection sensor changes an output signal thereof, and the detector detects the target area at each input of the pickup image irradiated with the reference light.

* * * * *